United States Patent
Ando

(10) Patent No.: US 8,129,934 B2
(45) Date of Patent: Mar. 6, 2012

(54) MOTOR DRIVER SUPPLYING DRIVE CURRENT WHILE ADJUSTING DECAY RATE THEREOF

(75) Inventor: Motohiro Ando, Kyoto (JP)

(73) Assignee: Rohm Co., Ltd., kyoto-fu (JP)

(*) Notice: Subject to any disclaimer, the term of this patent is extended or adjusted under 35 U.S.C. 154(b) by 492 days.

(21) Appl. No.: 12/364,583

(22) Filed: Feb. 3, 2009

(65) Prior Publication Data
US 2009/0206788 A1 Aug. 20, 2009

(30) Foreign Application Priority Data

Feb. 4, 2008 (JP) .................................. 2008-024014
Jan. 29, 2009 (JP) .................................. 2009-018543

(51) Int. Cl.
*H02P 8/00* (2006.01)
*G05B 19/40* (2006.01)

(52) U.S. Cl. ........................................ 318/696; 318/685

(58) Field of Classification Search .................. 318/685, 318/696
See application file for complete search history.

(56) References Cited

U.S. PATENT DOCUMENTS

| 4,127,801 A | * | 11/1978 | Leenhouts | .................... 318/696 |
| 5,982,134 A | * | 11/1999 | Tanaka | .......................... 318/696 |
| 2011/0057600 A1 | * | 3/2011 | Suda | ............................... 318/696 |

FOREIGN PATENT DOCUMENTS

JP  2004-336847  11/2004

* cited by examiner

*Primary Examiner* — Walter Benson
*Assistant Examiner* — Gabriel Agared
(74) *Attorney, Agent, or Firm* — Fish & Richardson P.C.

(57) ABSTRACT

A motor driver that supplies a drive current to a stepping motor includes a decay rate controller configured to mix a first decay rate and a second decay rate smaller than the first decay rate with each other, and set a plurality of mix decay rates, a control logic circuit configured to create magnetization patterns for attenuating the drive current at the mix decay rates, and a drive current output circuit configured to output the drive current to the stepping motor in accordance with the magnetization patterns.

2 Claims, 28 Drawing Sheets

FIG. 2

| Pin No. | Pin NAME | FUNCTION | Pin No. | Pin NAME | FUNCTION |
|---|---|---|---|---|---|
| P1 | PGND | Power GND | P13 | CLK | Clock In |
| P2 | OUT1B | H-Bridge output | P14 | CW_CCW | Rotatinal Direction Mode set |
| P3 | RNF1 | Current Detection resistor connected | P15 | TEST | TEST (connected to GND) |
| P4 | OUT1A | H-Bridge output | P16 | MODE0 | Magnetization Mode set |
| P5 | VCC1 | Power Supply | P17 | MODE1 | Magnetization Mode set |
| P7 | GND | Ground | P18 | ENABLE | Output Enable |
| P8 | CR | Chopping Frequency set | P19 | NC | Non Connection |
| P9 | DEC1 | Decay Mode set | P20 | VCC2 | Power Supply |
| P10 | DEC2 | Decay Mode set | P21 | OUT2A | H-Bridge output |
| P11 | VREF | Output Current set | P22 | RNF2 | Current Detection resistor connected |
| P12 | PS | Power Save | P23 | OUT2B | H-Bridge output |

FIG. 3

| CW_CCW | ROTATIONAL DIRECTION |
|---|---|
| L | Clockwise (CW) |
| H | Counter Clockwise (CCW) |

FIG. 4

| MODE0 | MODE1 | MOTOR MAGNETIZATION MODE |
|---|---|---|
| L | L | FULL STEP |
| H | L | HALF STEP A |
| L | H | HALF STEP B |
| H | H | QUARTER STEP |

FIG. 5

| ENABLE | MOTOR OUTPUT |
|---|---|
| L | OPEN |
| H | ACTIVE |

FIG. 6
| PS | STATE |
|---|---|
| L | STANDBY (RESET) |
| H | ACTIVE |
FIG. 7
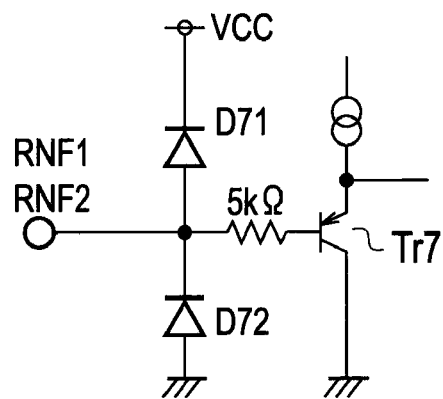
FIG. 8
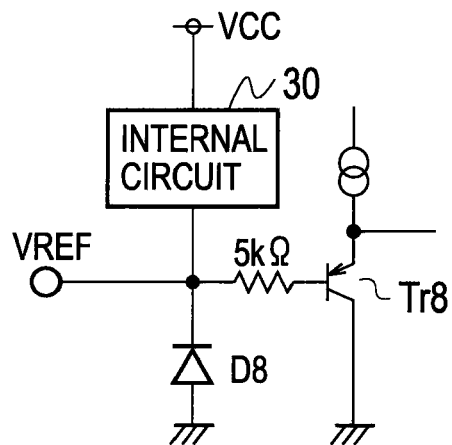

| DEC1 | DEC2 | CURRENT DECAY MODE |
|---|---|---|
| L | L | SLOW DECAY |
| H | L | MIX DECAY (FAST DECAY 15.0%) |
| L | H | MIX DECAY (FAST DECAY 40.0%) |
| H | H | MIX DECAY (FAST DECAY 75.0%) |

FIG. 19
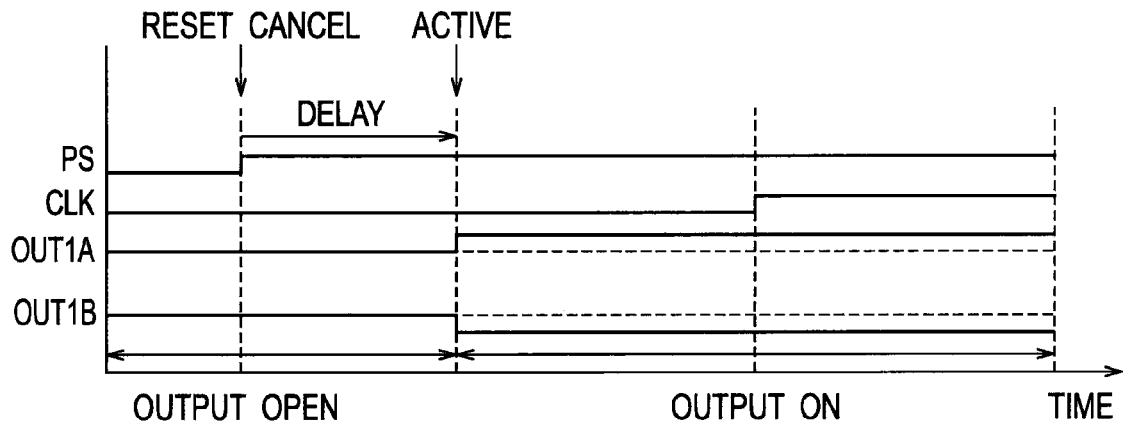
FIG. 20
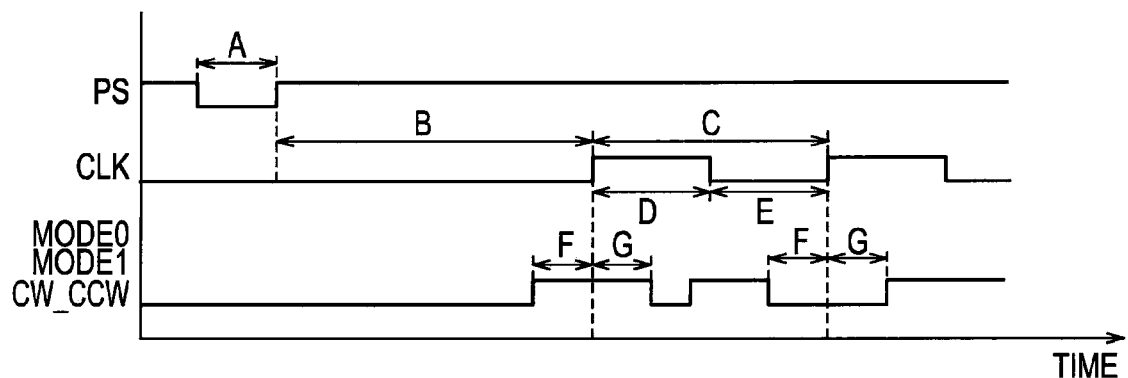
FIG. 21
| MAGNETIZATION MODE | INITIAL ELECTRICAL ANGLE |
|---|---|
| FULL STEP | 45° |
| HALF STEP A | 0° |
| HALF STEP B | 0° |
| QUARTER STEP | 0° |

FIG. 32

| ITEM | SYMBOL | LIMIT | | | UNIT | CONDITIONS |
|---|---|---|---|---|---|---|
| | | Min. | Typ. | Max. | | |
| WHOLE | | | | | | |
| Circuit current at standby | $I_{CCST}$ | – | 2.0 | 6.0 | mA | PS=L |
| Circuit current | $I_{CC}$ | – | 7.0 | 15.0 | mA | PS=H, VREF=3V |
| CONTROL INPUT | | | | | | |
| H level input voltage | $V_{INH}$ | 2.0 | – | 5.0 | V | |
| L level input voltage | $V_{INL}$ | 0 | – | 0.8 | V | |
| H level input current | $I_{INH}$ | 35 | 50 | 100 | µA | $V_{IN}$=5V |
| L level input current | $I_{INL}$ | -10 | 0 | – | µA | $V_{IN}$=0V |
| OUTPUT (OUT1A, OUT1B, OUT2A, OUT2B) | | | | | | |
| Output ON resistance | $R_{ON}$ | – | 2.0 | 2.6 | Ω | $I_{OUT}$=±0.5A, Sum of upper and lower |
| Output leak current | $I_{LEAK}$ | – | – | 10 | µA | |
| CURRENT CONTROL | | | | | | |
| RNF1,2 input current | $I_{RNF}$ | -40 | -20 | – | µA | RNF1,2=0V |
| VREF input current | $I_{VREF}$ | -2.0 | -0.1 | – | µA | VREF=0V |
| VREF input voltage range | $V_{REF}$ | 0 | – | 3.0 | V | |
| Comparator threshold | $V_{CTH}$ | 0.57 | 0.60 | 0.63 | V | VREF=3V |
| Minimum ON time (Blank time) | $t_{ONMIN}$ | 0.5 | 1.5 | 3.0 | µs | C3=470pF, R3=82KΩ |

FIG. 33

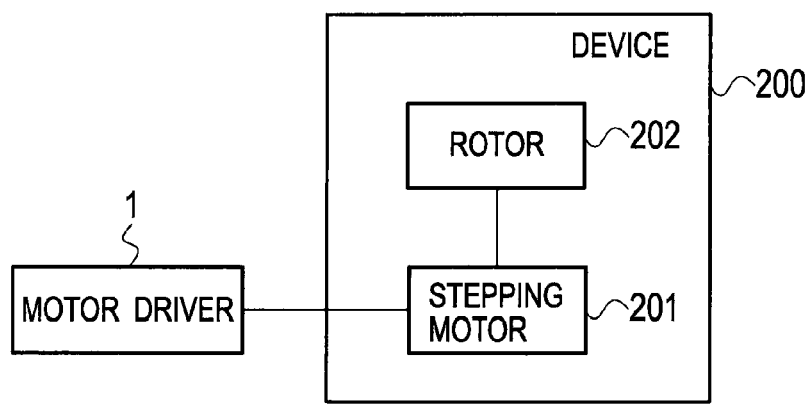

FIG. 35

| Pin No. | Pin NAME | FUNCTION | Pin No. | Pin NAME | FUNCTION |
|---|---|---|---|---|---|
| P1 | PGND | Power GND | P13 | PHASE1 | Phase change |
| P2 | OUT1B | H-Bridge output | P14 | I01 | VREF Division Ratio set |
| P3 | RNF1 | Current Detection resistor connected | P15 | I11 | VREF Division Ratio set |
| P4 | OUT1A | H-Bridge output | P16 | PHASE2 | Phase change |
| P5 | VCC1 | Power Supply | P17 | I02 | VREF Division Ratio set |
| P7 | GND | Ground | P18 | I12 | VREF Division Ratio set |
| P8 | CR | Chopping Frequency set | P19 | NC | Non Connection |
| P9 | DEC1 | Decay Mode set | P20 | VCC2 | Power Supply |
| P10 | DEC2 | Decay Mode set | P21 | OUT2A | H-Bridge output |
| P11 | VREF | Output Current set | P22 | RNF2 | Current Detection resistor connected |
| P12 | PS | Power Save | P23 | OUT2B | H-Bridge output |

FIG. 36

| PHASE1 | PHASE2 | OUT1A | OUT1B | OUT2A | OUT2B |
|---|---|---|---|---|---|
| L | L | L | H | L | H |
| H | L | H | L | L | H |
| L | H | L | H | H | L |
| H | H | H | L | H | L |

FIG. 37

| I01, I02 | I11, I12 | OUTPUT CURRENT (%) |
|---|---|---|
| L | L | 100 |
| H | L | 67 |
| L | H | 33 |
| H | H | 0 |

MOTOR DRIVER SUPPLYING DRIVE CURRENT WHILE ADJUSTING DECAY RATE THEREOF

CROSS REFERENCE TO RELATED APPLICATIONS AND INCORPORATION BY REFERENCE

This application is based upon and claims the benefit of priority from prior Japanese Patent Application P2008-024014 filed on Feb. 4, 2008 and prior Japanese Patent Application P2009-018543 filed on Jan. 29, 2009; the entire contents of which are incorporated by reference herein.

BACKGROUND OF THE INVENTION

1. Field of the Invention

The present invention relates to control of a motor, and particularly relates to a motor driver that drives a stepping motor.

2. Description of the Related Art

A stepping motor is used in order to operate sheet feed units of a copier and a printer or a capture unit of a scanner. The stepping motor includes a plurality of coils and a rotor. In the stepping motor, the rotor is pulled by magnetization force generated in such a manner that these coils are magnetized every time when a pulse signal is applied thereto from outside, and the rotor rotates by step by step. In general, a drive current for driving the stepping motor is adjusted by a motor driver, and rotation of the stepping motor is controlled.

For the purpose of reducing damped oscillations of the stepping motor, for example, a method is proposed, in which the drive current is decreased to reduce the oscillations in a low-speed rotation range and at the time of stopping the rotor.

However, in order to realize the optimum control states individually for a variety of stepping motors, it is necessary to set rates of attenuating the drive currents (hereinafter, referred to as "decay rates") in response to magnetization methods, drive current values and the like of the stepping motors. Therefore, the motor driver is required to have a function to make it possible to set in detail the decay rate of the drive current in response to specifications, usage purpose and the like of each of the stepping motors.

SUMMARY OF THE INVENTION

An aspect of the present invention is a motor driver that supplies a drive current to a stepping motor. The motor driver includes a decay rate controller configured to mix a first decay rate and a second decay rate smaller than the first decay rate with each other, and set a plurality of mix decay rates; a control logic circuit configured to create magnetization patterns for attenuating the drive current at the mix decay rates; and a drive current output circuit configured to output the drive current to the stepping motor in accordance with the magnetization patterns.

BRIEF DESCRIPTION OF THE DRAWINGS

FIG. 2 is a table showing information of input/output terminals of the motor driver shown in FIG. 1.

FIG. 3 is a table showing correspondences between setting values of a CW_CCW terminal and motor rotational directions.

FIG. 4 is a table showing correspondences between setting values of MODE terminals and motor magnetization modes.

FIG. 5 is a table showing correspondences between setting values of an ENABLE terminal and motor output states.

FIG. 6 is a table showing correspondences between a PS terminal and states of the motor driver.

FIG. 7 is an equivalent input circuit diagram of RNF terminals.

FIG. 8 is an equivalent input circuit diagram of a VREF terminal.

FIG. 19 is a timing chart for explaining reset operations of the motor driver according to the first embodiment of the present invention.

FIG. 20 is a timing chart for explaining control input timings of the motor driver according to the first embodiment of the present invention.

FIG. 21 is a table showing initial electrical angles in respective motor magnetization modes.

FIG. 22A shows a timing chart; and FIG. 22B shows torque vectors.

FIG. 23A shows a timing chart; and FIG. 23B shows torque vectors.

FIG. 24A shows a timing chart; and FIG. 24B shows torque vectors.

FIG. 25A shows a timing chart; and FIG. 25B shows torque vectors.

FIG. 32 is a table showing electric characteristics of the motor driver according to the first embodiment of the present invention.

FIG. 33 is a schematic diagram showing an example of controlling a device by the motor driver according to the first embodiment of the present invention.

FIG. 35 is a table showing information of input/output terminals of the motor driver shown in FIG. 34.

FIG. 36 is a table showing correspondences between setting values of PHASE terminals and output logics of a drive current output circuit.

FIG. 37 is a table sowing correspondences between setting values of VREF division ratio setting terminals and output current values.

FIG. 38A shows a timing chart; and FIG. 38B shows torque vectors.

FIG. 39A shows a timing chart; and FIG. 39B shows torque vectors.

FIG. 40A shows a timing chart; and FIG. 40B shows torque vectors.

FIG. 41A shows a timing chart; and FIG. 41B shows torque vectors.

DETAILED DESCRIPTION OF THE INVENTION

Figure 1:
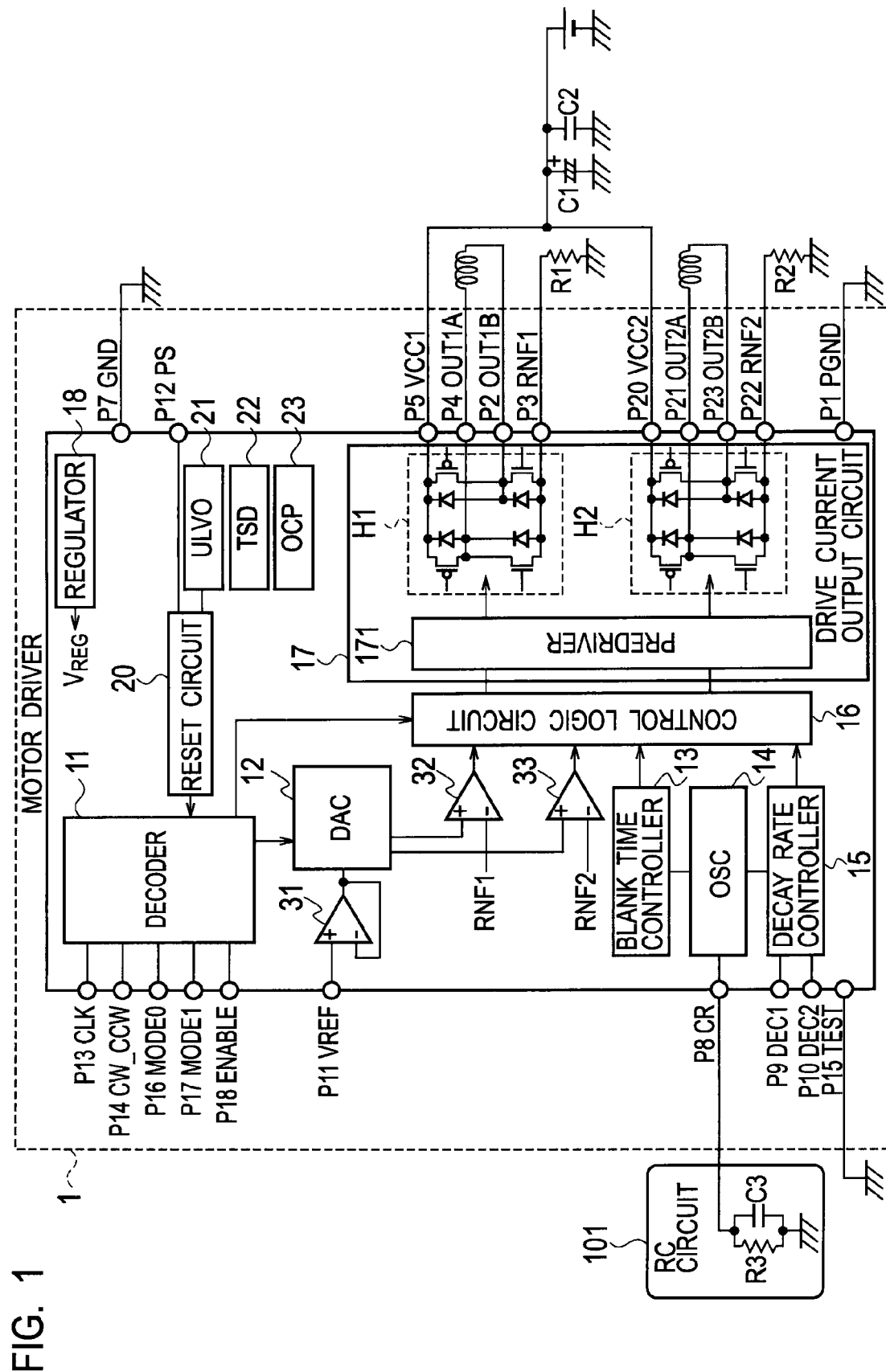
FIG. 1 is a schematic block diagram showing a configuration of a motor driver according to a first embodiment of the present invention.

A description will be made of first and second embodiments of the present invention with reference to the drawings. In the following description of the drawings, the same or similar reference numerals are applied to the same or similar parts and elements. The following embodiment just shows devices and methods to embody the technical idea of the present invention, and the technical idea of the present invention does not specify structures, and arrangements of the constituent components and the like to the following description. The technical idea of the present invention can be variously modified in the scope of claims.

First Embodiment

FIG. 1 shows a block diagram of a motor driver 1 according to the first embodiment of the present invention. The motor driver 1 is a motor driver that controls a bipolar-driven stepping motor adopting a pulse width modulation (PWM) constant current drive mode with a power supply rating of 50V. Although details will be described later, the motor driver 1 is capable of switching a motor magnetization mode among three types, which are: a full step (2-phase magnetization mode); a half step (1-2 phase magnetization mode); and a quarter step (quarter microstep: W1-2 phase magnetization mode). Moreover, current decay mode setting terminals (DEC1 terminal, DEC2 terminal) P9 and P10 are set, whereby a decay rate of attenuating a drive current of the stepping motor by PWM control can be set at four levels by using setting information equivalent to two bits.

As shown in FIG. 1, the motor driver 1 according to the first embodiment includes a decoder 11, a D/A converter (DAC) 12, a blank time controller 13, oscillation circuit (OSC) 14, a decay rate controller 15, a control logic circuit 16, a drive current output circuit 17, and a regulator 18.

The decoder 11 converts a clock signal supplied from outside into a parallel signal. Then, the decoder 11 sets drive timing of the stepping motor in accordance with a motor rotational direction, a motor magnetization mode and the like, which are set by a variety of input terminals. For example, the decoder 11 outputs a signal for setting output logics to the control logic circuit 16, and a signal for setting a value of an output current to the DAC 12. Moreover, the decoder 11 carries out an output of the motor driver 1 to open in response to signals and the like from a variety of protection circuits to stop supply of a drive current from the motor driver 1 to the stepping motor, and prevents a malfunction of the stepping motor. Details of the operations of the decoder 11 will be described later.

The DAC 12 outputs a voltage for setting a setting current value of the PWM-controlled drive current by using the output of the decoder 11 and a reference voltage set from the outside. Specifically, the DAC 12 divides the reference voltage, which is applied to an output current value setting terminal (VREF terminal) P11 and inputted through an operational amplifier 31 to the DAC 12 concerned, by a predetermined division ratio transmitted thereto from the decoder 11. Then, such a divided voltage of the reference voltage, which is outputted by the DAC 12, is compared with an output of the drive current output circuit 17, and the PWM control is executed. As shown in FIG. 1, such outputs of the DAC 12 are inputted to non-inverting input terminals of comparators 32 and 33, and such outputs of the drive current output circuit 17 are inputted to inverting input terminals of the comparators 32 and 33.

The blank time controller 13 is a circuit for setting a black time while the current detection is not being performed in the PWM control, thereby preventing the malfunction owing to spike noise generated when the output is switched ON. By such a function of the blank time controller 13, the stepping motor can be driven at a constant current without any external filter.

The OSC 14 outputs a triangular wave generated based on charge/discharge operations of an RC circuit 101 externally attached to the motor driver 1. A cycle of the generated triangular wave depends on a time constant of an output of the RC circuit 101.

By using a first decay rate and a second decay rate smaller than the first decay rate, the decay rate controller 15 sets a plurality of mixed decay rates of the drive current, in which the first decay rate and the second decay rate are mixed with each other, and control a current decay mode. A detailed setting method of the decay rate of the drive current will be described later.

The control logic circuit 16 obtains feedback of an output of the drive current output circuit 17 (hereinafter, referred to as a "motor output"), and operates to control a PWM constant current. Then, based on the outputs of the decoder 11, the DAC 12, the blank time controller 13, and the decay rate controller 15, the control logic circuit 16 creates a magnetization pattern for deciding a magnetization order, magnetization direction and magnetization amount of coils of the stepping motor to be controlled. For example, the control logic circuit 16 creates a magnetization pattern for attenuating the drive current at the mixed decay rate which is set by the decay rate controller 15. Details of such a PWM constant current control operation will be described later. The created magnetization pattern is transmitted to a pre-driver 171 of the drive current output circuit 17.

The drive current output circuit 17 has the pre-driver 171, a first H-bridge circuit H1 and a second H-bridge circuit H2, and outputs such drive currents to the stepping motor. The pre-driver 171 controls operations of the first H-bridge circuit H1 and the second H-bridge circuit H2 in accordance with the magnetization pattern created by the control logic circuit 16. The motor drive 1 drives the stepping motor by an output current IOUT(CH1) from the first H-bridge circuit H1 and an output current IOUT(CH2) from the second H-bridge circuit H2. Specifically, the drive current output circuit 17 outputs the drive currents in accordance with the magnetization pattern. Note that the first H-bridge circuit H1 is defined as a "channel 1 (CH1)", and the second H-bridge circuit H2 is defined as a "channel 2 (CH2)".

The regulator 18 generates an internal power supply voltage $V_{REG}$ for use in an inside of the motor driver 1 from a power supply voltage supplied to the motor driver 1.

The motor driver 1 further includes a variety of protection circuits, which are an undervoltage lockout (UVLO) circuit 21, a thermal shut down (TSD) circuit 22, and an overcurrent protection (OCP) circuit 23.

The UVLO circuit 21 is a circuit that prevents the malfunction of the motor output at the time when the power supply voltage is undervoltage. Specifically, in the case where the power supply voltage applied to power supply terminals (VCC1 terminal, VCC2 terminal) becomes a set value (for example, 15V) or less, the UVLO circuit 21 opens the motor output of the drive current output circuit 17. For this set value, for example, approximately 1V of hysteresis is provided in order to prevent the malfunction such as noise. Note that, when the UVLO circuit 21 operates, electrical angles are reset.

The TSD circuit 22 is a thermal shut down circuit disposed as a measure for protecting the motor driver 1 from overheating. In the case where a chip temperature of the motor driver 1 reaches a set value (for example, 175° C.) or higher, the TSD circuit 22 opens the motor output. Thereafter, when the chip temperature falls down to, for example, 150° C. or lower, the TSD circuit 22 automatically returns to a usual operation.

The OCP circuit 23 is a circuit for preventing a breakdown of the motor driver 1 when the output terminals cause a mutual short circuit, a short circuit to the power supply (short circuit to a higher-potential point), and a short circuit to the GND (earthing). The OCP circuit 23 monitors currents in the motor driver 1. When a current with a predetermined limitation value flows in the motor driver 1 for a set time (for example, approximately 4 µs), the OCP circuit 23 latches the motor output into an open state. By turning on the power supply one more time or applying a reset signal to a power save terminal (PS terminal) P12, the motor driver 1 returns to a usual state.

When the UVLO circuit 21 operates, the motor output is set to the open state, and at the same time, the decoder 11 is reset.

FIG. 2 shows information of input/output terminals of the motor driver 1 shown in FIG. 1. A description will be made below of the respective input/output terminals.

A phase-advancing clock input (clock IN) terminal (CLK terminal) P13 is a terminal to which a clock signal generated by an external clock circuit or the like is inputted. The CLK terminal P13 connects to the decoder 11. The motor driver 1 operates at a rising edge of the clock signal, and the electrical angle (step) of the stepping motor advances by one for every clock signal. When the noise is mixed into the CLK terminal P13, this causes a misstep of the motor. Accordingly, it is preferable to design a pattern that does not allow the noise to be mixed thereinto.

A motor rotational direction setting terminal (CW_CCW terminal) P14 sets the motor rotational directions of the stepping motor to be controlled. The CW_CCW terminal P14 connects to the decoder 11. A setting change of the motor rotational direction is reflected on a control method of the motor driver 1 at a rising edge of the CLK signal immediately after being changed. FIG. 3 shows correspondences between levels of the CW_CCW terminal P14 and the motor rotational directions.

For example, when the CW_CCW terminal P14 is set at a low (L) level, the motor rotational direction becomes a "clockwise" direction (hereinafter, referred to as a "CW direction") in such a manner that the output current IOUT (CH2) of the channel 2 (CH2) is outputted while being delayed in phase at 90° with respect to the output current IOUT(CH1) of the channel 1 (CH1). Meanwhile, when the CW_CCW terminal P14 is set at a high (H) level, the motor rotational direction becomes a "counterclockwise" direction (hereinafter, referred to as a "CCW direction") in such a manner that the output current IOUT(CH2) of the channel 2 (CH2) is outputted while advancing in phase at 90° with respect to the output current IOUT(CH1) of the CH1.

Motor magnetization mode setting terminals (MODE0 terminal, MODE1 terminal) P16 and P17 set the motor magnetization modes. The MODE0 terminal P16 and the MODE1 terminal P17 connect to the decoder 11. In response to signal levels inputted to the MODE0 terminal P16 and the MODE1 terminal P17, the decoder 11 transmits the division ratio of the reference voltage to the DAC 12, and the motor magnetization mode is set by the DAC 12.

FIG. 4 shows setting examples of the motor magnetization mode. For example, the MODE0 terminal P16 is set at the H level, and the MODE1 terminal P17 is set at the L level, whereby the motor magnetization mode is set at a "full step". Timing charts and torque vectors at the respective motor magnetization modes shown in FIG. 4, which are the "full step", a "half step A", a "half step B" and a "quarter step", will be described later.

An output enable terminal (ENABLE terminal) P18 is a terminal for forcibly switching OFF transistors (hereinafter, referred to as "output transistors") included in the first H-bridge circuit H1 and the second H-bridge circuit H2. Specifically, the ENABLE terminal P18 is used for opening the motor output. FIG. 5 shows setting examples of the ENABLE terminal P18. In the example shown in FIG. 5, when the L level is set in the ENABLE terminal P18, the motor output is opened, and when the H level is set therein, the motor driver 1 operates usually. In the case where the L level is set in the ENABLE terminal P18, the electrical angle and the respective operation modes are maintained even if the clock signal is inputted to the CLK terminal P13. The ENABLE terminal P18 connects to the decoder 11.

The PS terminal P12 is set for resetting (initializing) the decoder 11 to set the motor driver 1 in a standby state, and for opening the motor output. When the motor driver 1 turns to the standby state, the decoder 11 shown in FIG. 1 is reset, and the electrical angle is initialized. FIG. 6 shows setting examples of the PS terminal P12. In the examples shown in FIG. 6, when the L level is set in the PS terminal P12, the motor driver 1 turns to the standby state, and when the H level is set therein, the motor driver 1 operates usually. The PS terminal P12 connects to a reset circuit 20.

A testing terminal (TEST terminal) P15 is a terminal for use when the motor driver 1 is tested, and is connected to the GND when the motor driver 1 is actually used.

The DEC1 terminal P9 and the DEC2 terminal P10 are used for selecting the current decay mode as already described, and setting, at the four levels, the drive current of the stepping motor to be controlled. The DEC1 terminal P9 and the DEC2 terminal P10 connect to the decay rate controller 15. Details of the current decay mode will be described later.

Power supply terminals (VCC1 terminal, VCC2 terminal) P5 and P20 are applied with a power supply voltage individually supplied to the first H-bridge circuit H1 and the second H-bridge circuit H2. The output current IOUT(CH1) from the first H-bridge circuit H1 and the output current IOUT(CH2) from the second H-bridge circuit H2, which are the drive currents of the stepping motor, flow through the VCC1 terminal P5 and the VCC2 terminal P20.

An OUT1A terminal P4 and an OUT1B terminal P2, which are output terminals of the first H-bridge circuit H1, and an OUT2A terminal P21 and an OUT2B terminal P23, which are output terminals of the second H-bridge circuit H2, supply the drive currents to the stepping motor to be controlled. The OUT1A terminal P4, the OUT1B terminal P2, the OUT2A terminal P21 and the OUT2B terminal P23 (hereinafter, generically referred to as "output terminals") are terminals for supplying the drive currents from the motor driver 1 to the stepping motor. In accordance with the drive currents outputted from these output terminals, the coils of the stepping motor are magnetized step by step, and the rotor rotates.

A current detecting resistor R1 that detects the output current IOUT(CH1) from the first H-bridge circuit H1 and a current detecting resistor R2 that detects the output current IOUT(CH2) from the second H-bridge circuit H2 are connected to output current detecting resistor connection terminals (RNF1 terminal, RNF2 terminal) P3 and P22, respectively. The current detecting resistors R1 and R2 with a resistance value of approximately 0.4Ω to 1.0Ω, for example, 0.5Ω are inserted between the GND and the RNF1 terminal P3 and between the GND and the RNF2 terminal P22, respectively.

The output current value setting terminal (VREF terminal) P11 is a terminal that sets values of the output currents IOUT(CH1) and IOUT(CH2). Specifically, by a voltage $V_{REF}$ applied to the VREF terminal P11 and values $R_{NF}$ of the current detecting resistors connected to the RNF1 terminal P3 and the RNF2 terminal P22, an output current $I_{OUT}$ (IOUT(CH1)+IOUT(CH2)) is set as shown in Expression (1):

$$I_{OUT} = \{V_{REF}/5\}/R_{NF} \quad (1)$$

In Expression (1), the value 5 is the reference voltage division ratio in the inside of the motor driver 1.

A chopping frequency setting terminal (CR terminal) P8 is used for setting an output chopping frequency. Specifically, as shown in FIG. 1, the RC circuit 101 in which a capacitor C3 and a resistor R3 are connected in parallel to each other is connected between a CR terminal P6 and the GND. A capacitance value of the capacitor C3 is set at approximately 330 pF to 1500 pF, for example, at 470 pF, and a resistance value of the resistor R3 is set at approximately 15 kΩ to 200 kΩ, for example, at 82 kΩ. The output chopping frequency $f_{chop}$ is represented by Expression (2):

$$f_{chop} \approx 1/(0.916 \times C3 \times R3) \quad (2)$$

FIG. 7 to FIG. 11 show examples of equivalent input/output circuit diagrams of the input/output terminals. FIG. 7 is an equivalent input/output circuit diagram of the RNF1 terminal P3 and the RNF2 terminal P22. As shown in FIG. 7, each of the RNF1 terminal P3 and the RNF2 terminal P22 is connected through a resistor of approximately 5 kΩ to a base terminal of a PNP-type bipolar transistor Tr7 in which a collector is grounded. Moreover, between each of the RNF1 terminal P3 and the RNF2 terminal P22 and the power supply VCC, and between each of the RNF1 terminal P3 and the RNF2 terminal P22 and the GND, diodes D71 and D72 for preventing an electrostatic breakdown (ESD) are connected, respectively.

FIG. 8 is an equivalent input/output circuit diagram of the VREF terminal P11. As shown in FIG. 8, the VREF terminal P11 connects through a resistor of approximately 5 kΩ to a base terminal of a PNP-type bipolar transistor Tr8 in which a collector is grounded. Moreover, between the VREF terminal P11 and the GND, a diode D8 for preventing the ESD is connected. Furthermore, an internal circuit 30 is disposed between the VREF terminal P11 and the power supply VCC. The internal circuit 30 has the following function to prevent the malfunction when the power supply is not applied. In the case where a signal enters the VREF terminal P11 in a state where the power supply voltage is not applied to the motor driver 1, the internal circuit 30 functions so that this signal cannot be outputted to the power supply VCC.

The function to prevent the malfunction when the power supply is not applied is a function to prevent a malfunction caused by that, in the case where a logic control signal is inputted to an input terminal in a state where the power supply voltage is not applied thereto, a voltage of this input terminal is propagated through such an ESC preventing diode to the power supply voltage VCC, and the voltage is undesirably supplied to a power supply terminal of the motor driver 1 or to a power supply terminal of another integrated circuit on a set on which the motor driver 1 is disposed. Hence, even in the case where the voltage is applied to the input terminal when the power supply voltage is not supplied thereto, the motor driver 1 does not operate erroneously.

Figure 9:
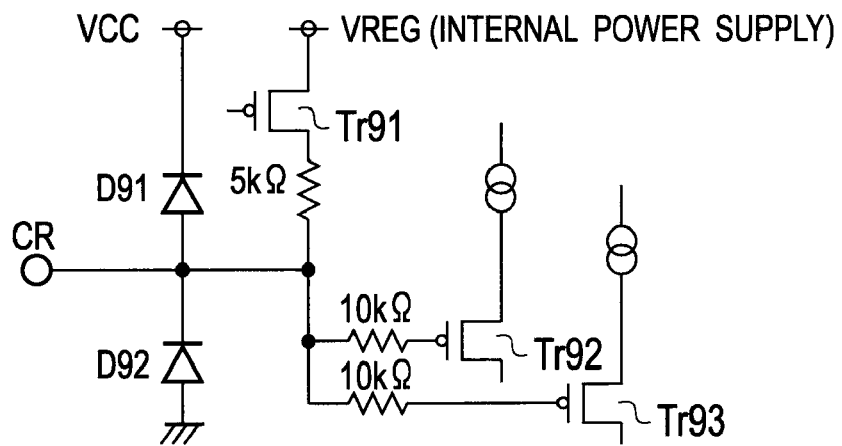
FIG. 9 is an equivalent input circuit diagram of a CR terminal.

FIG. 9 is an equivalent input/output circuit diagram of the CR terminal P8. As shown in FIG. 9, the CR terminal P8 connects through a resistor of approximately 5 kΩ to a drain terminal of a transistor Tr91 with a MOS structure. Moreover, the CR terminal P8 connects to a gate terminal of a transistor Tr92 with the MOS structure and a gate terminal of a transistor Tr93 with the MOS structure individually through resistors of approximately 10 kΩ. Moreover, between the CR terminal P8 and the power supply VCC and between the CR terminal P8 and the GND, diodes D91 and D92 for preventing the ESD are connected, respectively.

Figure 10:
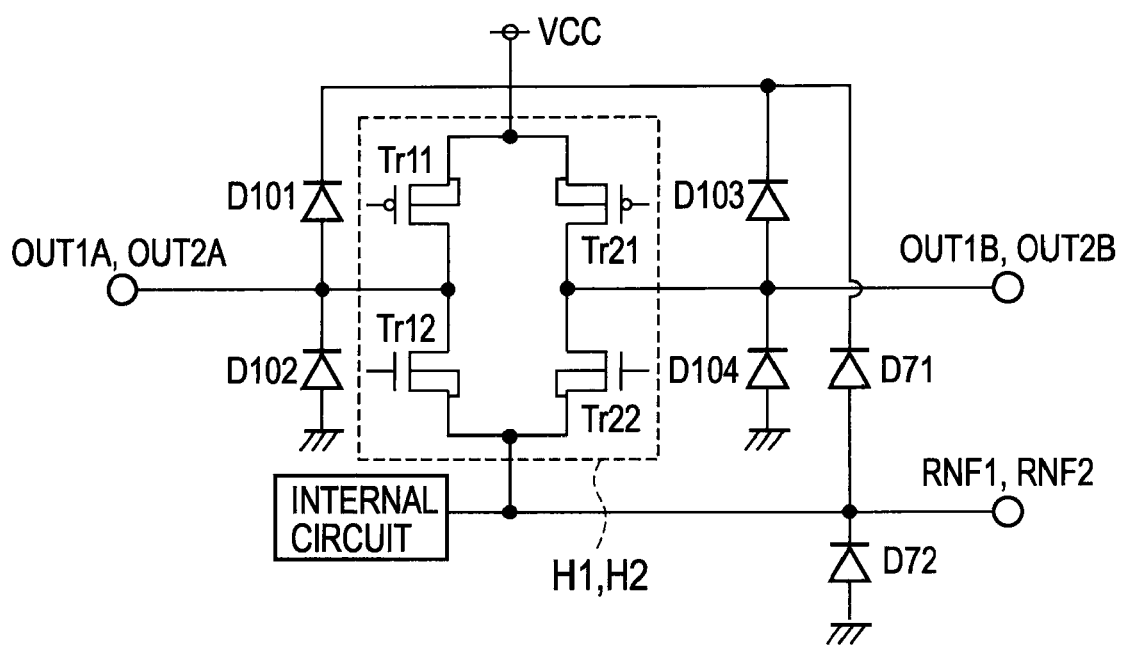
FIG. 10 is an equivalent output circuit diagram of output terminals.

FIG. 10 shows an equivalent input/output circuit diagram of the output terminals. As shown in FIG. 10, the output terminals are connected to the first H-bridge circuit H1, the second H-bridge circuit H2, the RNF1 terminal P3 and the RNF2 terminal P22. Specifically, the OUT1A terminal P4 is connected to a node thereof with an output transistor Tr11 and output transistor Tr12 of the first H-bridge circuit H1, and the OUT1B terminal P2 is connected to a node thereof with an output transistor Tr21 and output transistor Tr22 of the first H-bridge circuit H1. Moreover, the OUT2A terminal P21 is connected to a node thereof with an output transistor Tr11 and output transistor Tr12 of the second H-bridge circuit H2, and the OUT2B terminal P23 is connected to a node thereof with an output transistor Tr13 and output transistor Tr14 of the second H-bridge circuit H2. A node between the output transistor Tr11 and the output transistor Tr21 connects to the power supply VCC. A node between the output transistor Tr12 and output transistor Tr22 of the first H-bridge circuit H1 connects to the RNF1 circuit P3 and the internal circuit 30, and a node between an output transistor Tr12 and output transistor Tr22 of the second H-bridge circuit H2 connects to the internal circuit 30 and the RNF2 terminal P22.

Moreover, as shown in FIG. 10, between the power supply VCC and each of the OUT1A terminal P4 and the OUT2A terminal P21 and between the GND and each of the OUT1A terminal P4 and the OUT2A terminal P21, diodes D101 and D102 for preventing the ESD are connected, respectively. Between the power supply VCC and each of the OUT1B terminal P2 and the OUT2B terminal P23 and between the GND and each of the OUT1B terminal P2 and the OUT2B terminal P23, diodes D103 and D104 for preventing the ESC are connected, respectively.

Figure 11:
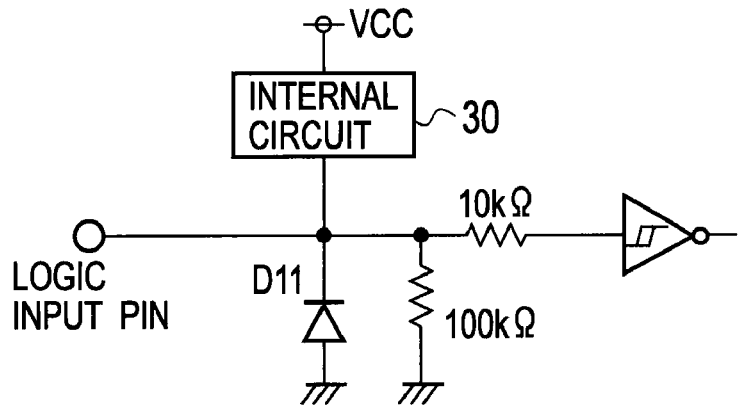
FIG. 11 is an equivalent input circuit diagram of another controlling input terminal.

FIG. 11 shows an example of an equivalent input circuit adoptable for an input terminal (logic controlling input terminal) other than the aboves. As shown in FIG. 11, the logic controlling input terminal connects through a resistor of approximately 10 kΩ to an internal logic circuit in the motor driver 1. Moreover, a diode D11 for preventing the ESD and a resistor of approximately 100 kΩ are connected in parallel to each other between the logic controlling input terminal and the GND. Moreover, the internal circuit 30 is disposed between the logic controlling input terminal and the power supply VCC.

Next, a description will be made of details of the operations of the motor driver 1 shown in FIG. 1. First, a description will be made of the operation of the PWM constant current control.

The output transistors are switched ON, whereby the output current $I_{OUT}$ (drive current) outputted from the drive current output circuit 17 is increased, and the voltage $V_{RNF}$ of each of the RNF1 terminal P3 and the RNF2 terminal P22 rises. The voltage $V_{RNF}$ is a voltage obtained by performing voltage conversion for the output current $I_{OUT}$ by each of the current detecting resistors R1 and R2 externally attached to the RNF1 terminal P3 and the RNF2 terminal P22. Then, when the voltage $V_{RNF}$ reaches a constant set voltage $V_S$ set by the DAC 12 based on the reference voltage $V_{REF}$ applied to the VREF terminal P11, a current limit comparator built in the control logic circuit 16 operates, and the operations shift to a mode where the output current $I_{OUT}$ decays (hereinafter, referred to as a "current decay mode"). Details of the current decay mode will be described later.

Thereafter, after elapse of a decay time by a "CR timer" to be described later, the operations shift to a mode where the output current $I_{OUT}$ is increased (hereinafter, referred to as an "output-ON mode"). The output-ON mode and the current decay mode are repeated, whereby the current control operation is executed. Switching of the output-ON mode and the current decay mode is performed by switching states of the output transistors of the first H-bridge circuit H1 and the second H-bridge circuit H2 in a manner to be described later.

Figure 12:
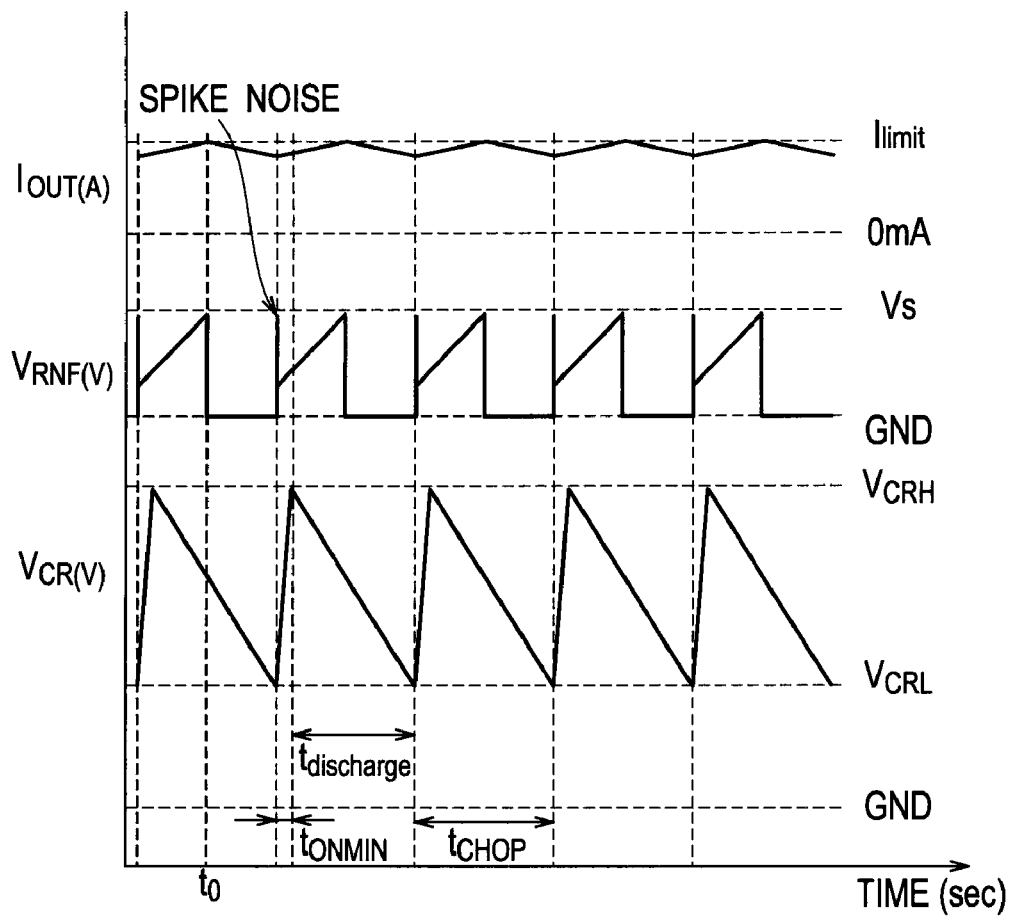
FIG. 12 is a timing chart for explaining operations of a CR timer of the motor driver according to the first embodiment of the present invention.

Here, an operation of the "CR timer" will be described. By the charge/discharge operations in the RC circuit 101 that is externally attached to the CR terminal P8 and includes the resistor R3 and the capacitor C3, as shown in FIG. 12, a voltage $V_{CR}$ of the CR terminal P8 fluctuates between a voltage $V_{CRH}$ and a voltage $V_{CRL}$. For example, the voltage $V_{CRH}$ is set at approximately 2.5V, and the voltage $V_{CRL}$ is set at approximately 1V. The voltage $V_{CR}$ is outputted as a triangular wave signal from the OSC 14 to the blank time controller 13 and the decay rate controller 15.

In the output-ON mode, when the voltage $V_{CR}$ reaches the voltage $V_{CRH}$, the discharge operation is started. Then, when the output current $I_{OUT}$ reaches a set current value $I_{limit}$ in a discharge section where the voltage $V_{CR}$ drops from the $V_{CRH}$ to the voltage $V_{CRL}$, the voltage $V_{RNF}$ reaches the set voltage $V_S$, and the operations shift to the current decay mode where the output current $I_{OUT}$ is decreased. Thereafter, when the voltage $V_{CR}$ reaches the voltage $V_{CRL}$ by the discharge operation, the operations return to the output-ON mode from the current decay mode, and at the same time, the charge operation is started. During a charging period, the output current $I_{OUT}$ and the voltage $V_{RNF}$ are increased. Note that the set voltage $V_S$ is set by the DAC 12 by using the reference voltage $V_{REF}$ so that the operations can shift to the current decay mode when the output current $I_{OUT}$ reaches the desired set current value $I_{limit}$.

As described above, the charge/discharge time in the RC circuit 101 is used as the CR timer. By using the CR timer as described above, the motor driver 1 operates as a PWM constant current controller of an external magnetization mode. Therefore, the number of external circuits can be reduced more than in the case of a self-magnetization mode of individually controlling the CH1 and the CH2. As a result, a size of a set including the motor driver 1 can be reduced.

With regard to the charge/discharge time in the RC circuit 101, a minimum ON time $t_{ONMIN}$ and a discharge time $t_{discharge}$ are decided by the following Expression (3) by the resistor R3 and the capacitor C3 as shown in FIG. 12:

$$t_{ONMIN} \approx C3 \times R_{IN} \times R3/(R_{IN}+R3) \times \ln\{(V_R-V_{CRL})/(V_R-V_{CRH})\} \quad (3)$$

In Expression (3), $V_R = V_{REG} \times R3/(R_{IN}+R3)$ when an internal power supply voltage of the motor driver 1 is defined as $V_{REG}$. Moreover, $R_{IN}$ is an internal impedance of the CR terminal P8, which is approximately 5 kΩ. The minimum ON time $t_{ONMIN}$ is the charge time in the RC circuit 101. Note that the sum of the minimum ON time $t_{ONMIN}$ and the discharge time $t_{discharge}$ is a chopping cycle $t_{CHOP}$.

When the resistance value of the resistor R3 is low, the voltage $V_{CR}$ does not reach the $V_{CRH}$. Accordingly, it is preferable that the resistor R3 be a resistor of 5 kΩ or more, for example, a resistor of approximately 15 kΩ to 200 kΩ. With regard to the capacitor C3, when a capacitor of several thousand picofarads or more is used, the minimum ON time $t_{ONMIN}$ is elongated, and it is apprehended that the output current $I_{OUT}$ may flow more in volume than the set current value $I_{limit}$ depending on an inductance value and resistance value of motor coils of the stepping motor. Accordingly, it is necessary to pay attention to the capacitance value of the capacitor C3. A capacitance of approximately 330 pF to 1500 pF is preferable for the capacitor C3. Since a generation time of the spike noise is approximately several hundred nanoseconds, the minimum ON time $t_{ONMIN}$ is set at, for example, approximately 1 μs.

In the case where the chopping cycle $t_{CHOP}$ is set too long, a ripple of the output current $I_{OUT}$ is increased, an average current value is decreased, and rotation efficiency of the stepping motor is thereby decreased in some case. Accordingly, it is necessary to pay attention to this case. The resistor R3 and the capacitor C3 are selected so that a motor drive sound of the stepping motor, distortion of an output current waveform, and the like can be restricted to the minimum, whereby the chopping cycle $t_{CHOP}$ is set.

At the time when the operations shift to the output-ON mode, the spike noise as shown in FIG. 12 is generated in the voltage $V_{RNF}$ in some case. This spike noise is generated by the fact that a current penetrating the output transistor Tr11 and output transistor Tr12 of each of the H-bridge circuits shown in FIG. 10 flows at a moment when the output transistor Tr11 is switched ON. In order to avoid erroneous detection by the current limit comparator owing to the spike noise, a charge section from the start of the charge after the voltage $V_{CR}$ reaches the voltage $V_{CRL}$ to the point of time when the voltage $V_{CR}$ reaches the voltage $V_{CRH}$ is set at the minimum ON time $t_{ONMIN}$, and the current detection by the current limit comparator is invalidated.

Specifically, the blank time controller 13 monitors the voltage $V_{CR}$ as the triangular wave signal outputted from the OSC 14, and sets, as a blank time, the charge section while the voltage $V_{CR}$ reaches the voltage $V_{CRH}$ from the voltage $V_{CRL}$. The set blank time is transmitted to the control logic circuit 16, and during the blank time, the control logic circuit 16 invalidates the current detection performed by the current limit comparator. The black time is set as described above, whereby a noise cancelling function is realized, and constant current drive without any external filter is executed.

Next, a description will be made of the current decay mode of the motor driver 1 shown in FIG. 1. In the PWM constant current drive operation by the motor driver 1, the decay rate of the drive current can be at the four levels.

ON/OFF of the output transistors included in the first H-bridge circuit H1 and the second H-bridge circuit H2 are controlled, whereby a decay mode with a first decay rate (hereinafter, referred to as a "fast decay mode") and a decay mode with a second decay rate smaller than the first decay rate (hereinafter, referred to as a "slow decay mode") are set.

Figure 13:
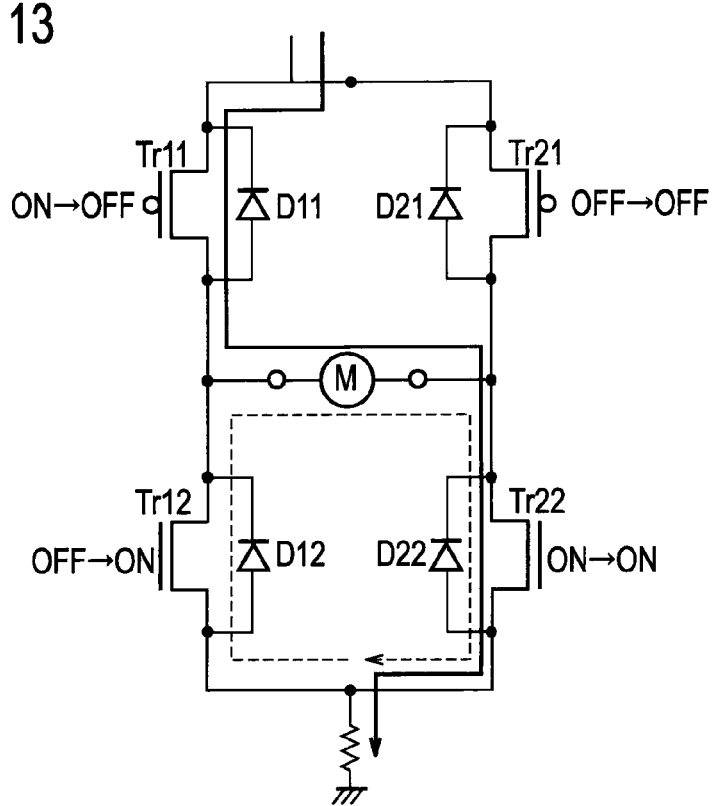
FIG. 13 is a schematic diagram for explaining states of output transistors and a route of a regenerative current in a slow decay mode of the motor driver according to the first embodiment of the present invention.
Figure 14:
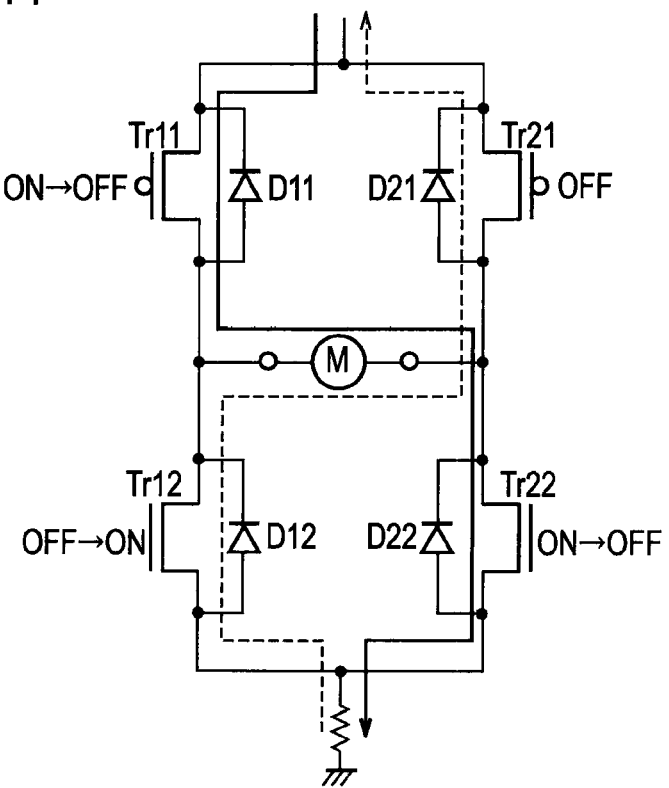
FIG. 14 is a schematic diagram for explaining states of the output transistors and the route of the regenerative current in a fast decay mode of the motor driver according to the first embodiment of the present invention.

With respective reference to FIG. 13 and FIG. 14, a description will be made of states of the output transistors and routes of regenerative currents in the first H-bridge circuit H1 and the second H-bridge circuit H2 in the slow decay mode and the fast decay mode. Current routes shown by solid-line arrows in FIG. 13 and FIG. 14 are routes of regenerative currents at the time of the output-ON time, and current routes shown by broken-line arrows in FIG. 13 and FIG. 14 are routes of regenerative currents at the time of the current decay mode.

The first H-bridge circuit H1 and the second H-bridge circuit H2 have the same circuit configuration. As shown in FIG. 13 and FIG. 14, a circuit form of an H-bridge is composed of the output transistors Tr11, Tr12, Tr21 and Tr22, which are four double diffusion-type MOS (DMOS) transistors, and the body diodes D11, D12, D21 and D22 accompany these output transistors, respectively. A node between the output transistor Tr11 and the output transistor Tr12 and a node between the output transistor Tr21 and the output transistor Tr22 are connected to each other by a coil M.

The OUT1A terminal P4 or the OUT2A terminal P21 connects to the node between the output transistor Tr11 and the output transistor Tr12. The OUT1B terminal P2 or the OUT2B terminal P23 connects to the node between the output transistor Tr13 and the output transistor Tr14.

For the first H-bridge circuit H1 and the second H-bridge circuit H2, such low-ON-resistance DMOS transistors are adopted, whereby it becomes possible to flow the current in two directions, and switching resistance of each of the output transistors is reduced to a large extent. As a result, a voltage drop can be decreased more than in the case of using the bipolar transistors. Moreover, power consumption is reduced in comparison with the case of using the bipolar transistors, and accordingly, a package can be made small.

As shown in FIG. 13, in the slow decay mode, at the time of the output-ON mode, the output transistor Tr11 and the output transistor TR22 are in an ON state, and the output transistor Tr12 and the output transistor Tr21 are in an OFF state. Moreover, the output current flows through a sequential route from the output transistor Tr11 through the coil M to the output transistor Tr22. Meanwhile, when the mode shifts to the current decay mode, the output transistor TR11 is switched OFF, and the output transistor Tr12 is switched ON. The output transistor Tr22 maintains the ON state, and the output transistor Tr21 maintains the OFF state. The regenerative current flows through a sequential route from the output transistor Tr12 through the coil M to the output transistor Tr22.

In the slow decay mode, the voltage applied between both ends of each motor coil is small at the time when the current decays, and the regenerative current is gently reduced. Therefore, the current ripple is reduced, and this is advantageous in terms of motor torque. However, the slow decay mode is prone to be affected by an increase of the output current owing to deterioration of current controllability in a small current range, and by a motor counter electromotive voltage at the time of high pulse rate drive in the half step mode and the quarter step mode. Therefore, the current waveform cannot follow a change of the set current value $I_{limit}$ of the output current $I_{OUT}$, and is consequently distorted, and the oscillations of the motor are increased in some case.

As shown in FIG. 14, states of the output transistors at the time of the output-ON mode in the fast decay mode are the same as those at the output-ON mode in the slow decay mode, and the output current flows through the sequential route from the output transistor Tr11 through the coil M to the output transistor Tr22. Meanwhile, when the mode shifts to the current decay mode, the output transistor TR11 and the output transistor Tr22 are switched OFF, and the output transistor Tr12 is switched ON. The output transistor Tr21 maintains the OFF state. The regenerative current flows through a sequential route from the output transistor Tr12 through the coil M to the output transistor Tr21. At this time, the regenerative current flows through the body diode D21 accompanying the output transistor Tr21; however, the output transistor Tr21 may be switched ON. Moreover, in order to prevent the penetration current from flowing by the fact that the output transistor Tr11 and the output transistor Tr12 are switched ON simultaneously, a state where the output transistor Tr11 and the output transistor Tr12 are switched OFF may be inserted into a period while the respective states of the output transistor Tr11 and the output transistor Tr12 are being changed.

In the fast decay mode, the regenerative current is radically reduced. Accordingly, the distortion of the current waveform in the high pulse rate drive can be reduced. Specifically, the fast decay mode is suitable for such a case where the slow decay mode cannot allow the decay of the current to follow the output change of the DAC 12 that controls the number of revolutions of the stepping motor. However, the ripple of the output current is increased, accordingly, the average current is decreased, and such problems occur, which are: (1) a decrease of the motor torque; and (2) an increase of heat generation as a result of an increase of a motor loss. Measures can be taken against the decrease of the motor torque by increasing the set current value $I_{limit}$; however, in this case, it is necessary to make consideration so that the output current $I_{OUT}$ cannot exceed the output rated current.

As a method of improving the above-described problems in the slow decay mode and the fast decay mode, the motor driver 1 switches the fast decay mode and the slow decay mode during the current decay period, thereby can set a decay mode with, as a decay rate of the drive current during the current decay period, a decay rate (mixed decay rate) obtained by mixing the decay rate (first decay rate) of the fast decay mode and the decay rate (second decay rate) of the slow decay mode with each other. The set decay mode in this case will be referred to as a "mix decay mode" hereinafter.

Figures 15, 16:
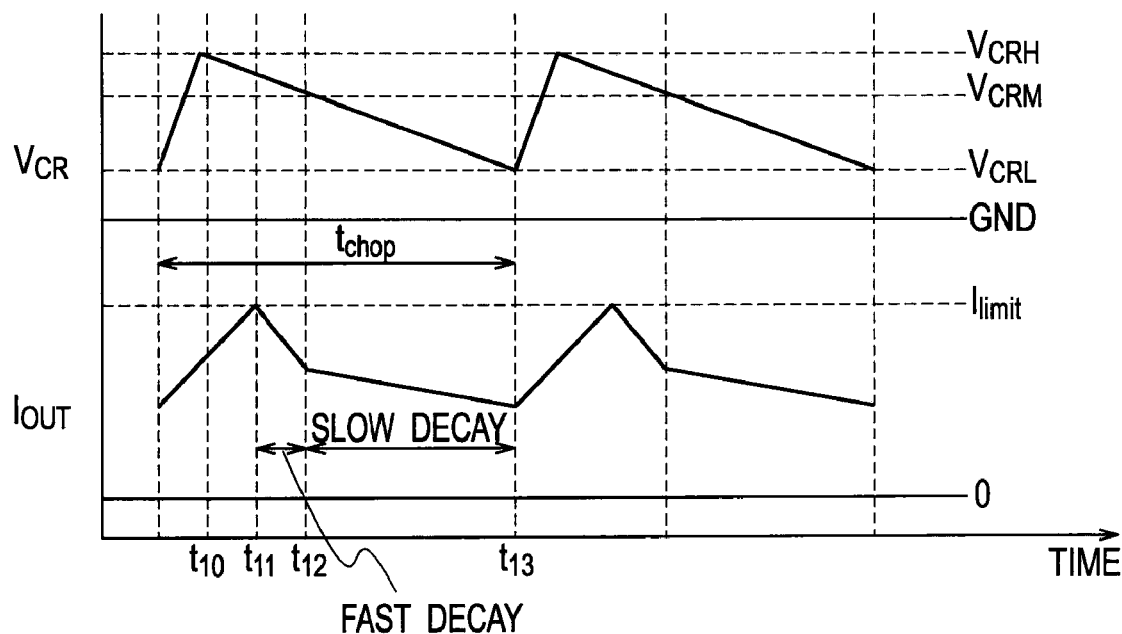
FIG. 15 is a timing chart for explaining the current decay modes of the motor driver according to the first embodiment of the present invention.
FIG. 16 is a table showing correspondences between settings of DEC terminals and the current decay modes.

Specifically, during the current decay period of attenuating the drive current, the decay rate controller 15 changes a ratio of a period of attenuating the drive current at the first decay rate and a period of attenuating the drive current at the second decay rate, and sets a mix decay rate as a current decay rate during the entire current decay period. As shown in FIG. 15, during the mix decay mode, the fast decay mode is set during an approximate first half (times t10 to t12) of the charge period (times t10 to t13) in the chopping cycle $t_{CHOP}$, and the slow decay mode is set during a subsequent period (times t12 to t13). However, in the case where the output current $I_{OUT}$ does not reach the set current value $I_{limit}$ within the period in the charge period, which is defined by the DEC1 terminal P9 and the DEC2 terminal P10, the fast decay mode is not performed.

The decay rate controller 15 sets a switching voltage $V_{CRM}$ in response to levels of signals applied to the DEC1 terminal P9 and the DEC2 terminal P10. Then, the decay rate controller 15 monitors the voltage $V_{CR}$ of the triangular wave signal outputted from the OSC 14, sets a discharge period while the voltage $V_{CR}$ is dropping from the voltage $V_{CRH}$ to the switching voltage $V_{CRM}$ to the fast decay mode, and sets a discharge period while the voltage $V_{CR}$ is dropping from the switching voltage $V_{CRM}$ to the voltage $V_{CRL}$ to the slow decay mode. The current decay modes thus set are transmitted to the control logic circuit 16, and the control logic circuit 16 controls the drive current output circuit 17 by a magnetization pattern on which the set current decay modes are reflected.

The switching voltage $V_{CRM}$ can be set by using the setting information equivalent to two bits based on the signal levels of the DEC1 terminal P9 and the DEC2 terminal P10. For example, the decay rate controller 15 can set a combination of the low decay mode and the fast decay mode during the discharge period at the four levels. Therefore, the optimum controls can be realized individually for stepping motors with a variety of specifications.

FIG. 16 shows relationships between the voltage levels, which are set for the DEC1 terminal P9 and the DEC2 terminal P10, and the current decay modes. For example, both of the DEC1 terminal P9 and the DEC2 terminal P10 are set at the L level, whereby the decay mode turns to the slow decay mode during the entire discharge period. Moreover, the DEC1 terminal P9 is set at the H level, and the DEC2 terminal P10 is set at the L level, whereby the decay mode turns to the fast decay mode during a beginning 15.0% period of the discharge period, and turns to the slow decay mode during a residual 85.0% period thereof. A combination of ratios between such fast and slow decay mode periods is arbitrarily settable.

The larger the ratio of the slow decay mode period is, the lower the mix decay rate as the current decay rate during the discharge period, that is, the entire current decay period, becomes. As already described, as the ratio of the fast decay mode period is being increased, the ripple of the output current $I_{OUT}$ is increased; however, follow-up of the current decay to the change of the set current value $I_{limit}$ is enhanced.

For example, there is such a case as follows. When the ratio of the fast decay mode period is 15.0%, the current decay cannot follow the change of the set current value $I_{limit}$, when the ratio of the fast decay mode period is 40.0%, the current decay can follow the change concerned, and when the ratio of the fast decay mode period is 75%, the ripple of the output current $I_{OUT}$ is too large. In such a case, the DEC1 terminal P9 is set at the L level, the DEC2 terminal P10 is set at the H level, whereby the ratio of the fast decay mode period is set at 40.0%.

Figure 17:
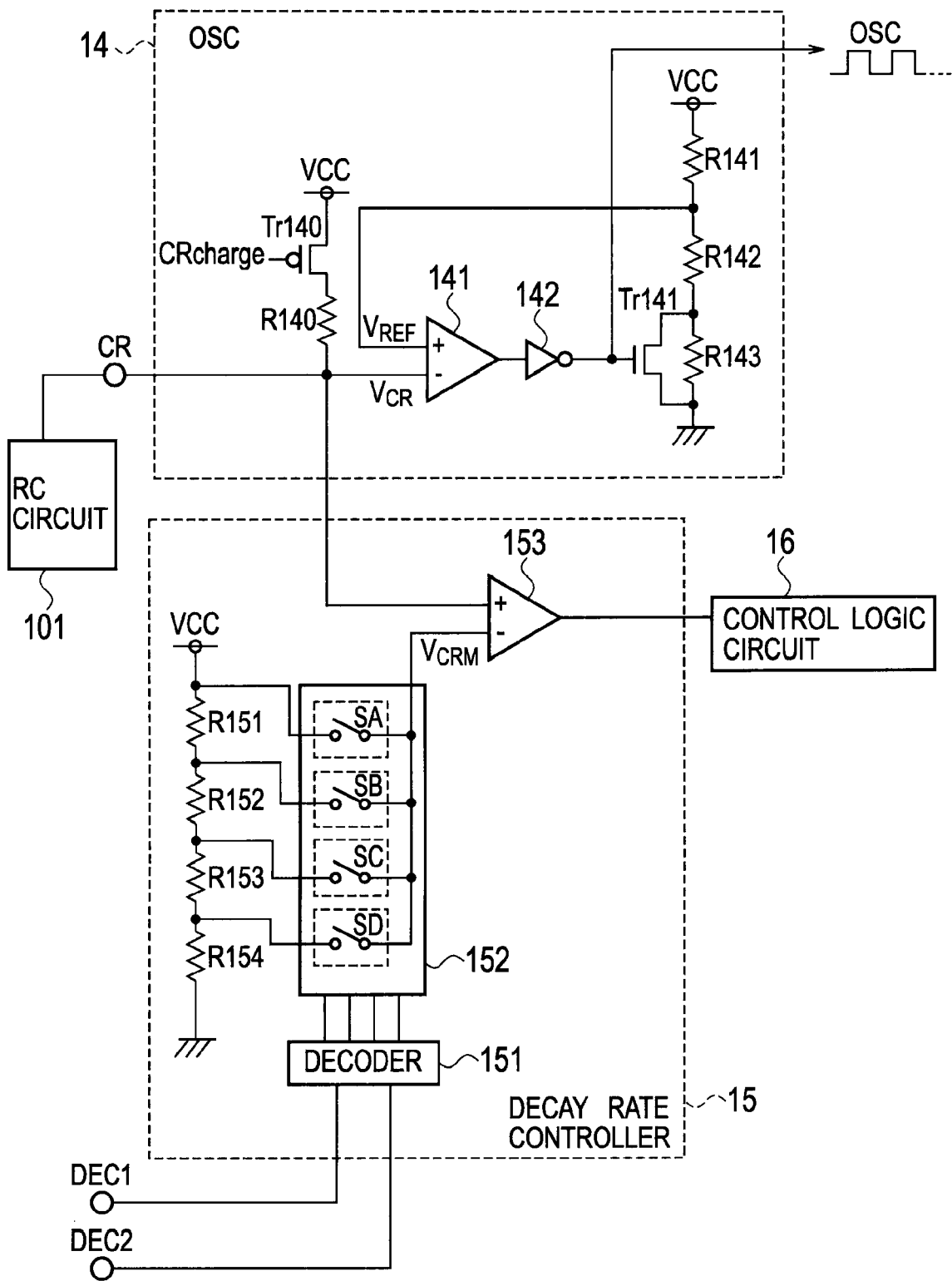
FIG. 17 is a schematic circuit diagram showing a configuration example of a triangular wave generator and a decay rate controller according to the first embodiment of the present invention.

FIG. 17 shows a circuit configuration example of the triangular wave generator 14 and the decay rate controller 15. First, a description will be made of operations of the triangular wave generator 14.

In the triangular wave generator 14 shown in FIG. 17, resistors R141 to R143 are connected in series between the power supply VCC and the GND, and the reference voltage $V_{REF}$ is generated at a node between the resistor R141 and the resistor R142. Each end of the resistor R143 is individually connected to a source terminal and drain terminal of a transistor Tr141. The reference voltage $V_{REF}$ is inputted to a non-inverting input terminal of an operational amplifier 141, and a voltage applied to the CR terminal by the charge/discharge of the RC circuit 101 is inputted to an inverting input terminal of the operational amplifier 141. An output of the operational amplifier 141 is inputted to a gate terminal of the transistor Tr141 through an inverter 142. Note that a square-wave signal OSC outputted from the inverter 142 is transmitted to the control logic circuit 16 through the blank time controller 13.

Moreover, the triangular wave generator 14 includes a transistor Tr140 in which a source terminal connects to the power supply VCC, and a drain terminal connects to one end of a resistor R140. The other end of the resistor R140 connects to the CR terminal. A square-wave signal CRcharge to which feedback of the signal OSC is made is inputted to a gate terminal of the transistor Tr140.

In the triangular wave generator 14 composed as described above, the voltage $V_{CR}$ of the CR terminal fluctuates between the voltage $V_{CRH}$ and the voltage $V_{CRL}$ in response to a comparison result between an output voltage of the RC circuit 101 that repeats the charge/discharge and the reference voltage $V_{REF}$. For example, in the case where a value of the power supply VCC is 5V, and values of the resistors R141 to R143 are 100 kΩ, 25 kΩ and 75 kΩ, respectively, the voltage $V_{CRH}$ is set at 2.5V and the voltage $V_{CRL}$ is set at 1V.

Figure 18:
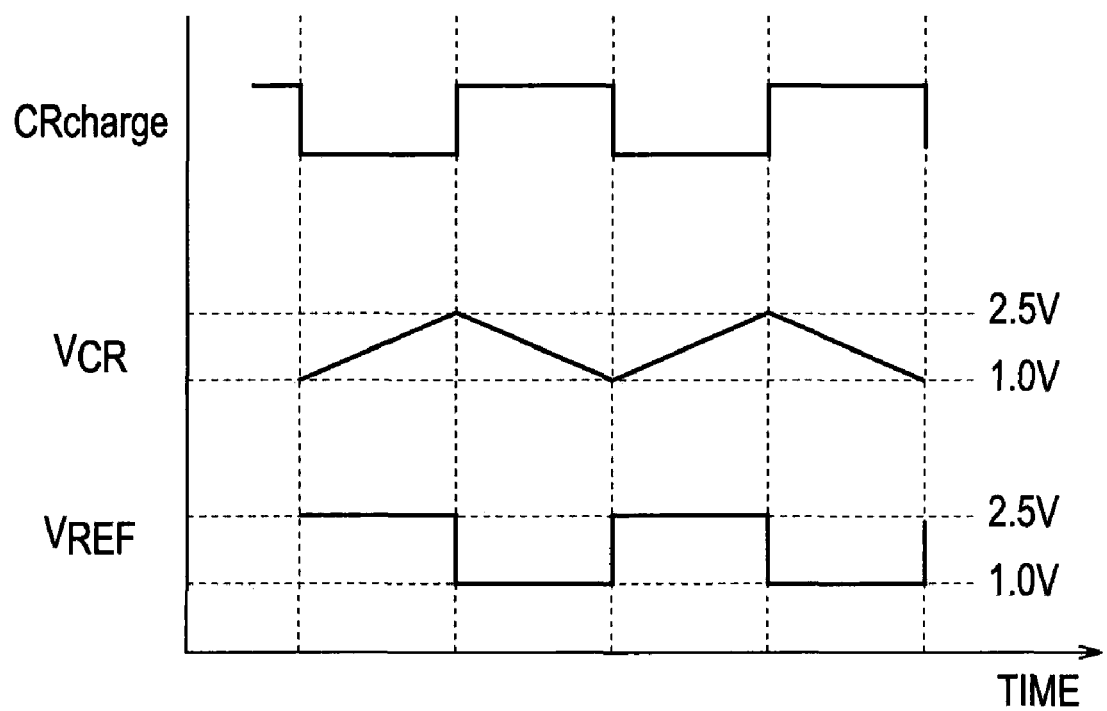
FIG. 18 is a timing chart for explaining an operation example of the triangular wave generator according to the first embodiment of the present invention.

FIG. 18 shows an example of timing charts of the signal CRcharge, the voltage $V_{CR}$ and the reference voltage $V_{REF}$ in the case where the voltage $V_{CRH}$ is 2.5V and the voltage $V_{CRL}$ is 1V. As shown in FIG. 18, when the signal CRcharge is at the low level, the voltage $V_{CR}$ is increased from the voltage $V_{CRL}$ to the voltage $V_{CRH}$, and the reference voltage $V_{REF}$ is at the high level. Meanwhile, when the signal CRcharge is at the high level, the voltage $V_{CR}$ is decreased from the voltage $V_{CRH}$ to the voltage $V_{CRL}$, and the reference voltage $V_{REF}$ is at the low level.

As shown in FIG. 17, the voltage $V_{CR}$ is outputted from the triangular wave generator 14 to the decay rate controller 15. In the decay rate controller 15, the voltage $V_{CR}$ is inputted to a non-inverting input terminal of an operational amplifier 153, and the switching voltage $V_{CRM}$ is inputted to an inverting input terminal of the operational amplifier 153. An output signal of the operational amplifier 153 is outputted to the control logic circuit 16. The current decay mode is set in response to a comparison result between the voltage $V_{CR}$ and the switching voltage $V_{CRM}$. Specifically, as already described, the discharge period while the voltage $V_{CR}$ is dropping from the voltage $V_{CRH}$ to the switching voltage $V_{CRM}$ is set to the fast decay mode, and the discharge period while the voltage $V_{CR}$ is dropping from the switching voltage $V_{CRM}$ to the voltage $V_{CRL}$ is set to the slow decay mode. The control logic circuit 16 controls the drive current output circuit 17 based on a magnetization pattern on which the set current decay mode is reflected.

The decay rate controller 15 shown in FIG. 17 sets the switching voltage $V_{CRM}$ in response to 2-bit input signals applied to the DEC1 terminal and the DEC2 terminal. In the example shown in FIG. 17, reference voltages, which are generated individually on the terminals of resistors R151 to R154 connected in series between the power supply VCC and the GND, are inputted to switches SA to SD of a selection circuit 152. One switch is selected from the switches SA to SD by a decoder 151, and one of the reference voltages created by the resistors R151 to R154 is outputted as the switching voltage $V_{CRM}$ from the selection circuit 152. For the switches SA to SD, for example, pass transistors and the like are adoptable.

In the example shown in FIG. 17, the switching voltage $V_{CRM}$ can be set arbitrarily by setting values of the resistors R151 to R154. FIG. 16 shows the example where the ratio of the fast decay mode period in the mix decay mode is 15%, 40% and 75%; however, the ratio of the fast decay mode period can be set arbitrarily to a desired value by selecting a resistance ratio among the resistors R151 to R154. Moreover, the number of resistors connected in series between the power supply VCC and the GND, the number of switches of the selection circuit 152, and the number of terminals (DEC terminals) which input the input signals to the decoder 151 are increased, thus making it possible to increase types of the mix decay mode, which are different in ratio of the fast decay mode period, to three types or more.

Next, a description will be made of operations of the decoder 11. The motor driver 1 has the decoder 11 built therein, and thereby can drive the stepping motor in a clock IN (CLK_IN) drive mode. Here, the "clock IN drive mode" refers to a mode where the number of input terminals for the clock signal for controlling operation timing of the motor driver 1 is one. Specifically, the number of clock input terminals to which the clock signal from the outside is inputted is saved to one, which is the CLK terminal P13. Accordingly, there is an effect that the number of ports to be used by a central processing unit (CPU) board can be suppressed.

First, a description will be made of a reset operation of the decoder 11. Initialization of the decoder 11 is performed by setting a power-ON reset function and the PS terminal P12. Initialization of the decoder 11 at the time when the power supply is turned on differs between the case where the PS terminal P12 is at the L level and the case where the PS terminal P12 is at the H level.

In the case where the PS terminal P12 is at the L level, the power-ON reset function works in the inside of the motor driver 1 at the time when the power supply is turned on, and the decoder 11 is initialized. However, as long as the PS terminal P12 is at the L level, the motor output is in the open state. The PS terminal P12 is set at the H level after the power supply voltage is applied thereto, the motor output turns to an active state, the drive current is outputted, and the magnetization is applied at an initial electrical angle. However, as shown in FIG. 19, in the case where a reset signal PS transmitted from the PS terminal P12 to the decoder 11 is raised from the L level to the H level, a delay of approximately 40 μs at the maximum occurs until the motor outputs (OUT1A, OUT1B) of the drive current output circuit 17 turn to the active state as a result of returning from the standby state to the usual state.

In the case where the reset signal PS is at the H level, the power-ON reset function works in the inside of the motor driver 1 after the power supply voltage is applied thereto, and the decoder 11 is initialized. Thereafter, if the signal of the H level is already inputted to the ENABLE terminal P18, then the motor output turns to the active state, and the magnetization is applied at the initial electrical angle.

In the case where the initialization of the decoder 11 is performed during the drive of the stepping motor, the PS terminal P12 is set to the H level from the L level, and the reset signal PS is set at the H level. However, a delay of approximately 40 μs at the maximum occurs until the motor outputs turn to the active state as a result of returning from the standby state to the usual state since the reset signal PS is set at the H level.

Next, a description will be made of control input timings of the decoder 11. The decoder 11 basically operates at the rising edge of the clock signal CLK, and accordingly, normally operates at the input timings shown in FIG. 20. Note that a delay of approximately 40 μs at the maximum occurs until the motor outputs turn to the active state as a result of returning from the standby state to the usual state by the fact that the reset signal PS is raised from the L level to the H level. During this delay time, a phase-advancing operation is not performed even if the clock signal CLK is inputted.

As shown in FIG. 20, a time (minimum input L pulse width) A while the reset signal PS transmitted from the PS terminal P12 to the decoder 11 is being left at the L level is approximately 20 μs. Moreover, in consideration for the above-described delay time, a time (maximum delay time that enables CLK rising edge input) B until the rising edge of clock signal CLK is inputted since the reset signal PS is raised to the H level is 40 μs or more.

The minimum cycle C of the clock signal CLK shown in FIG. 20 is set at approximately 4 μs. In this case, the minimum input H pulse width D is set at approximately 2 μs, and the minimum input L pulse width E is set at approximately 2 μs. Both of a setup time F and hold time G of a setting signal MODE0, a setting signal MODE1 and a setting signal CW_CCW, which are transmitted to the decoder 11 from the MODE0 terminal P16, the MODE1 terminal P17 and the CW_CCW terminal P14, respectively, are set at approximately 1 μs. As already described, signal levels of the setting signal MODE0 and the setting signal MODE1 are set, whereby the motor magnetization mode is set.

FIG. 21 shows the electrical angles (initial electrical angles) in the respective motor magnetization modes in the standby state immediately after the reset. As shown in FIG. 21, only the initial electrical angle at the time of the "full step" is 45°, and the initial electrical angles in the other motor magnetization modes are 0°.

FIGS. 22A, 23A, 24A and 25A show timing charts in the respective motor magnetization modes shown in FIG. 4, and FIGS. 22B, 23B, 24B and 24B show torque vectors therein.

FIGS. 22A to 25A show timing charts of the "full step", the "half step A", the "half step B" and the "quarter step". Each of FIGS. 22A to 25A shows states of the reset signal PS, the clock signal CLK, the output signal OUT1A of the OUT1A terminal P4 of the CH1 and the output signal OUT1B of the OUT1B terminal P2 thereof, the output signal OUT2A of the OUT2A terminal P21 of the CH2 and the output signal OUT2B of the OUT2B terminal P23 thereof, the output current IOUT(CH1) of the CH1, and the output current IOUT (CH2) of the CH2. As already described, the "CH1" denotes the first H-bridge circuit H1, and the "CH2" denotes the second H-bridge circuit H2.

FIGS. 22B to 25B show torque vectors of the output signal OUT1A, the output signal OUT1B, the output signal OUT2A and the output signal OUT2B in the respective "full step", "half step A", "half step B" and "quarter step".

In FIGS. 22A to 25B (timing charts and torque vectors), the setting signal CW_CCW is set at the L level that designates the CW direction, and with regard to the motor rotational direction, the current of the CH2 is outputted while being delayed by a phase of 90° with respect to the current of the CH1. An output enable signal ENABLE transferred from the ENABLE signal P18 to the decoder 11 is set at the H level at which the motor driver 1 operates usually.

First, a description will be made of the case where the motor magnetization mode is the "full step". The setting signal MODE0 is set at the L level, and the setting signal MODE1 is set at the L level, whereby the motor magnetization mode is set at the "full step".

Figure 22A:
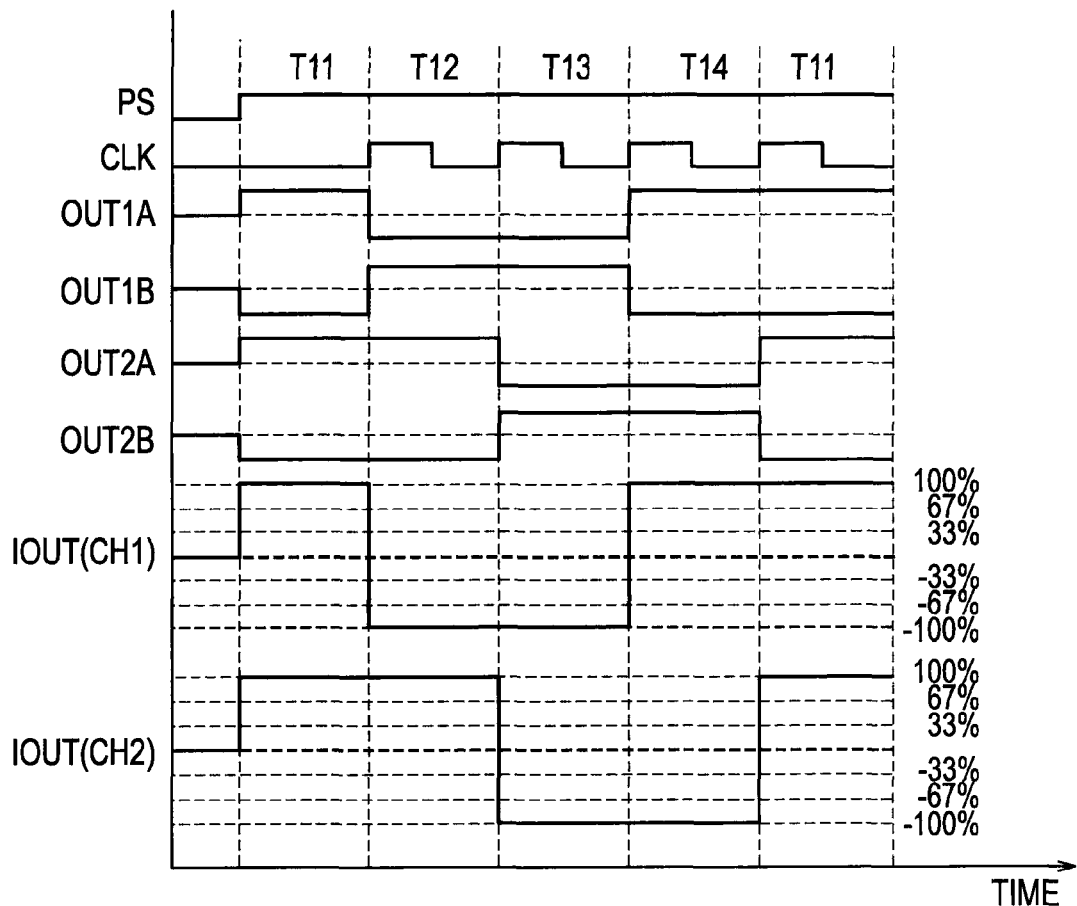
FIGS. 22A and 22B are views explaining operations of the motor driver according to the first embodiment of the present invention in the full step mode.
Figure 22B:
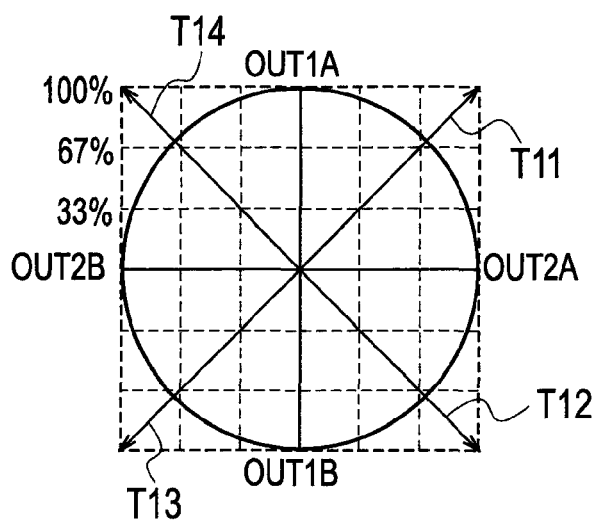

As shown in FIG. 22A, when the reset signal PS rises to the H level in a period T11, the output signal OUT1A rises to the H level, and the output signal OUT1B drops to the L level. Moreover, the output signal OUT2A rises to the H level, and the output signal OUT2B drops to the L level. In the period T11, the output current IOUT(CH1) and the output current IOUT(CH2) flow in a + direction. Here, the "+direction" is a direction from the OUT1A terminal P4 to the OUT1B terminal P2, or a direction from the OUT2A terminal P21 to the OUT2B terminal P23.

When the clock signal CLK rises up in a period T12, the output signal OUT1A drops to the L level, and the output signal OUT1B rises to the H level. The output signal OUT2A and the output signal OUT2B are not changed. Therefore, the direction of the output current IOUT(CH1) is reversed, and the direction of the output current IOUT(CH2) is not changed.

When the clock signal CLK rises up in a period T13, the output signal OUT2A drops to the L level, and the output signal OUT2B rises to the H level. The output signal OUT1A and the output signal OUT1B are not changed. Therefore, the direction of the output current IOUT(CH1) is not changed, and the direction of the output current IOUT(CH2) is reversed.

When the clock signal CLK rises up in a period T14, the output signal OUT1A rises to the H level, and the output signal OUT1B drops to the L level. The output signal OUT2A and the output signal OUT2B are not changed. Therefore, the direction of the output current IOUT(CH1) is reversed, and the direction of the output current IOUT(CH2) is not changed.

Thereafter, when the clock signal CLK rises up, the output signal OUT2A rises to the H level, and the output signal OUT2B drops to the L level. The output signal OUT1A and the output signal OUT1B are not changed. Therefore, the direction of the output current IOUT(CH1) is not changed, and the output current IOUT(CH2) is reversed. Specifically, such a "full step" mode returns to the same state as that in the period T11. Thereafter, the operations in the period T11 to the period T14 are repeated.

As described above, in the case where the motor magnetization mode is the "full step", the clock signal CLK is changed four times, whereby the electrical angle reaches 360°. Hence, the torque vector at the time of the "full step" is shown like FIG. 22B.

Figure 23A:
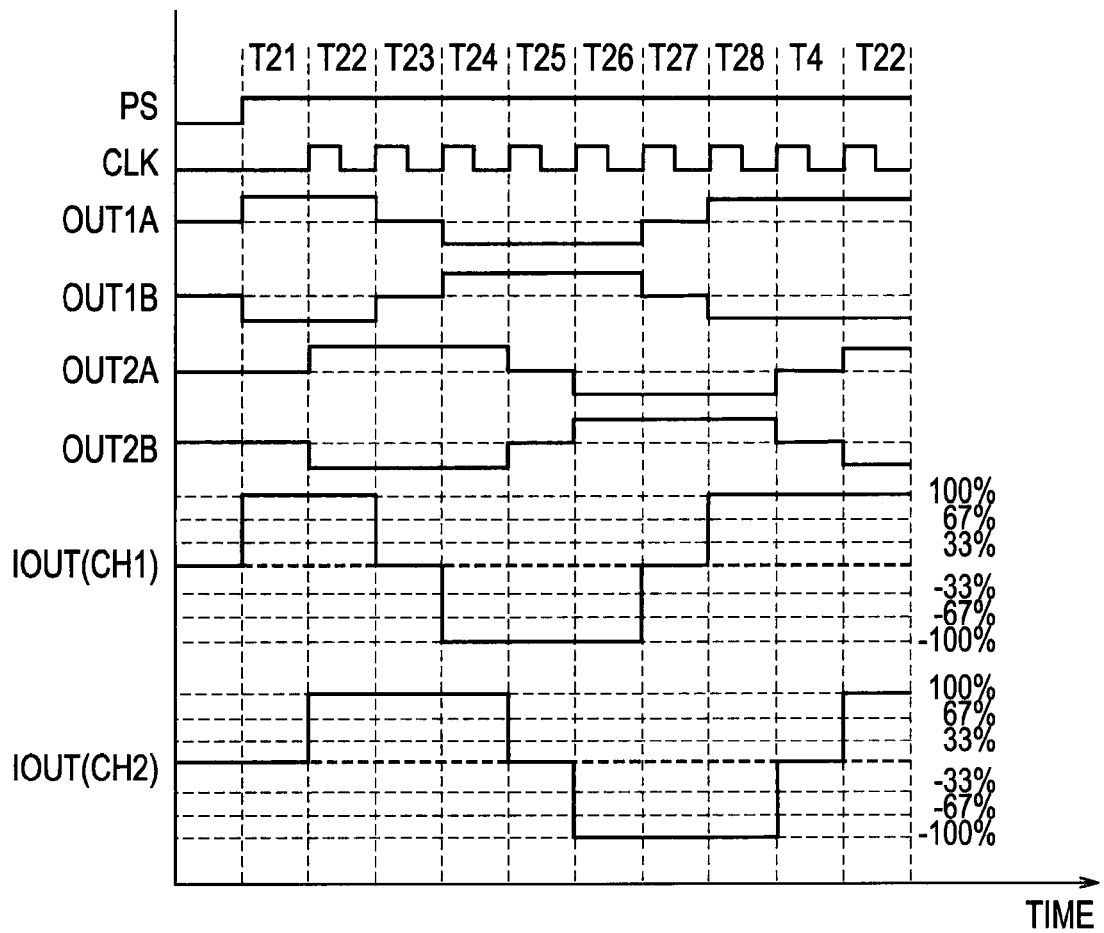
FIGS. 23A and 23B are views explaining operations of the motor driver according to the first embodiment of the present invention in the half step A mode.
Figure 23B:
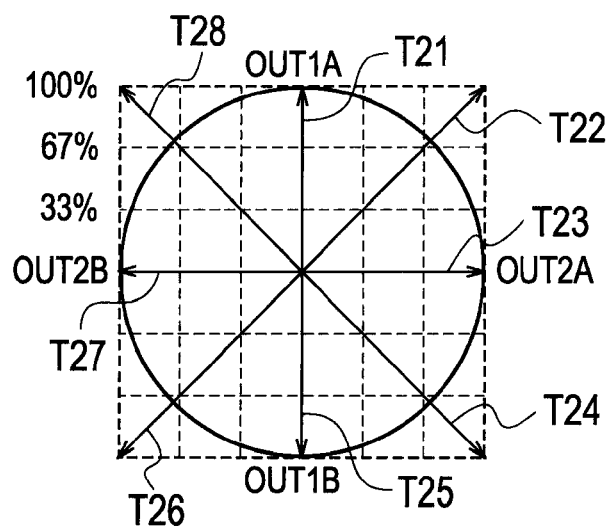
Figure 24A:
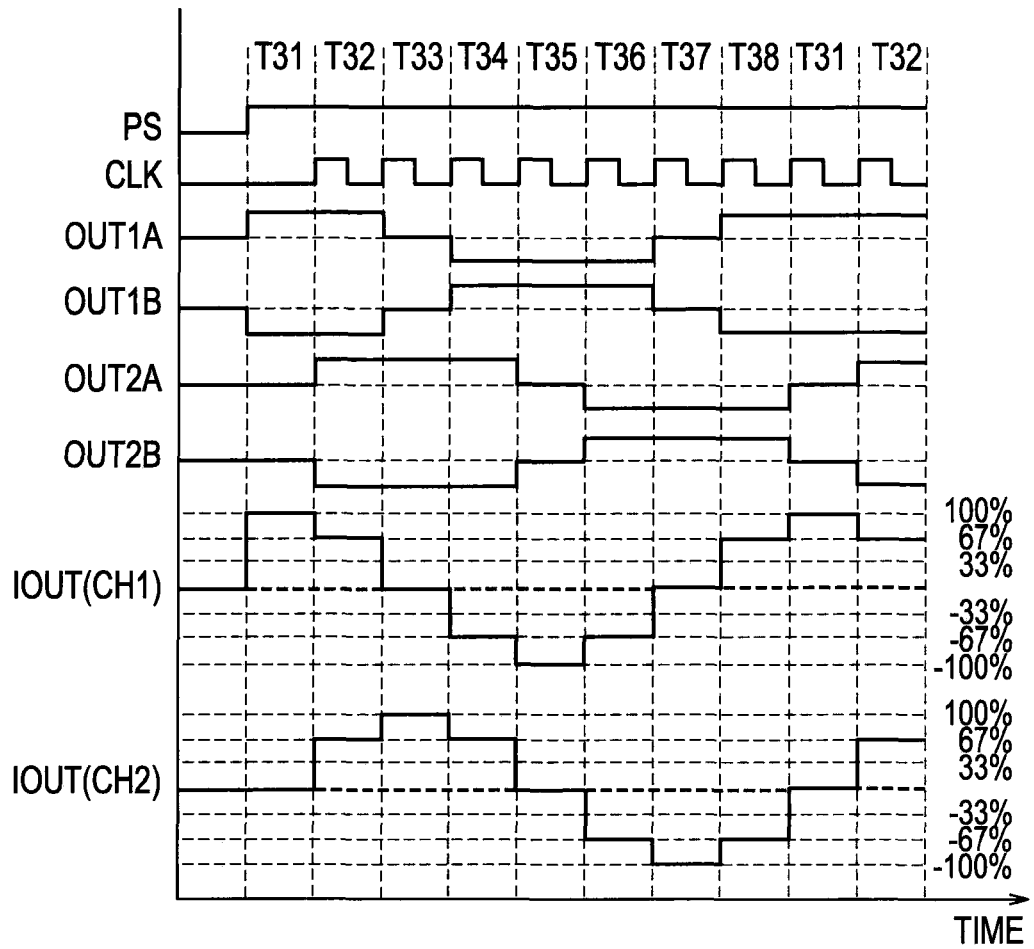
FIGS. 24A and 24B are views explaining operations of the motor driver according to the first embodiment of the present invention in the half step B mode.
Figure 24B:
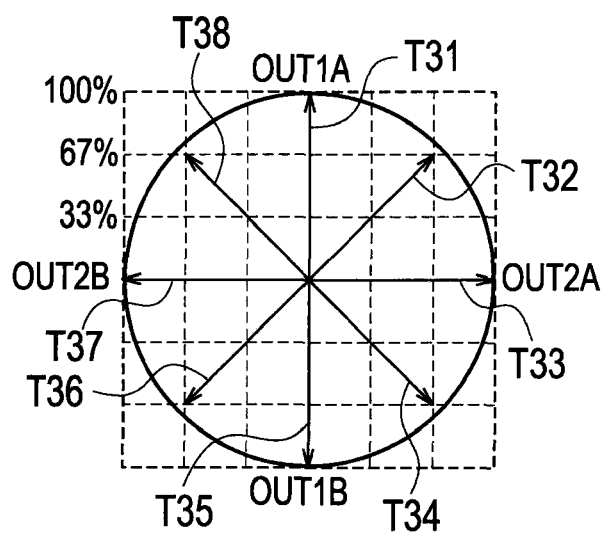

A description will be made of the case where the motor magnetization mode is the "half step". FIG. 23A and FIG. 23B show an example of the "half step A" of fully (with a magnitude of 100%) outputting the output current. FIG. 24A and FIG. 24B show an example of the "half step B" in which magnitudes of the output current IOUT(CH1) and the output current IOUT(CH2) are restricted to thereby set a magnitude of the drive current at a substantially constant value without depending on the electrical angles. In the "half step B", the torque of the stepping motor is reduced though the rotation thereof is smooth. In response to a combination of the setting signal MODE0 and the setting signal MODE1, the DAC 12 determines whether or not to restrict the magnitude of the output current, and sets a restriction amount of the case of restricting the output current. In the example shown in FIG. 4, the setting signal MODE0 is set at the H level, and the setting signal MODE1 is set at the L level, whereby the motor magnetization mode is set at the "half step A".

As shown in FIG. 23A, when the reset signal PS rises to the H level in a period T21, the output signal OUT1A of the CH1 rises to the H level, and the output signal OUT1B thereof drops to the L level. Moreover, the output signal OUT2A and output signal OUT2B of the CH2 is at a 0 level. In the period T21, the output current IOUT(CH1) fully flows in the + direction, and the output current IOUT(CH2) does not flow.

When the clock signal CLK rises up in a period T22, the output signal OUT2A rises to the H level, and the output signal OUT2B drops to the L level. The output signal OUT1A and the output signal OUT1B are not changed. The direction of the output current IOUT(CH1) is not changed, and the output current IOUT(CH2) fully flows in the +direction.

When the clock signal CLK rises up in a period T23, the output signal OUT1A and the output signal OUT1B turn to the 0 level. The output signal OUT2A and the output signal OUT2B are not changed. The output current IOUT(CH1) does not flow, and the direction of the output current IOUT(CH2) is not changed.

When the clock signal CLK rises up in a period T24, the output signal OUT1A drops to the L level, and the output signal OUT1B rises to the H level. The output signal OUT2A and the output signal OUT2B are not changed. The output current IOUT(CH1) fully flows in a − direction, and the output current IOUT(CH2) is not changed.

When the clock signal CLK rises up in a period T25, the output signal OUT2A and the output signal OUT2B turn to the 0 level. The output signal OUT1A and the output signal OUT1B are not changed. The output current IOUT(CH1) is not changed, and the output current IOUT(CH2) does not flow.

When the clock signal CLK rises up in a period T26, the output signal OUT2A drops to the L level, and the output signal OUT2B rises to the H level. The output signal OUT1A and the output signal OUT1B are not changed. The direction of the output current IOUT(CH1) is not changed, and the output current IOUT(CH2) fully flows in the − direction.

When the clock signal CLK rises up in a period T27, the output signal OUT1A and the output signal OUT1B turn to the 0 level. The output signal OUT2A and the output signal OUT2B are not changed. The output current IOUT(CH1) does not flow, and the direction of the output current IOUT(CH2) is not changed.

When the clock signal CLK rises up in a period T28, the output signal OUT1A rises to the H level, and the output signal OUT1B drops to the L level. The output signal OUT2A and the output signal OUT2B are not changed. The output current IOUT (CH1) fully flows in the + direction, and the direction of the output current IOUT(CH2) is not changed.

Thereafter, when the clock signal CLK rises up, the output signal OUT2A rises to the H level, and the output signal OUT2B drops to the L level. The output signal OUT1A and the output signal OUT1B are not changed. The direction of the output current IOUT(CH1) is not changed, and the output current IOUT(CH2) does not flow. Specifically, such a "half step A" mode returns to the same state as that in the period T21. Thereafter, the operations in the period T21 to the period T28 are repeated.

As described above, in the case where the motor magnetization mode is the "half step A", the clock signal CLK rises up eight times, whereby the electrical angle reaches 360°. Hence, the torque vector at the time of the "half step A" is shown like FIG. 23B.

The setting signal MODE0 is set at the L level, and the setting signal MODE1 is set at the H level, whereby the motor magnetization mode is set at the "half step B". As shown in FIG. 24A and FIG. 24B, operations in the "half step B" are basically the same as the operations in the "half step A". However, in the case where the directions of the output current IOUT(CH1) and the output current IOUT(CH2) are changed as shown in FIG. 24A, the output current IOUT (CH1) and the output current IOUT(CH2) pass through periods while values thereof are 67%. Specifically, in the periods while the output current IOUT(CH1) and the output current IOUT(CH2) flow simultaneously, the values of the output currents are restricted to 67%. Hence, the torque vector at the time of the "half step B" is shown like FIG. 24B.

Figure 25A:
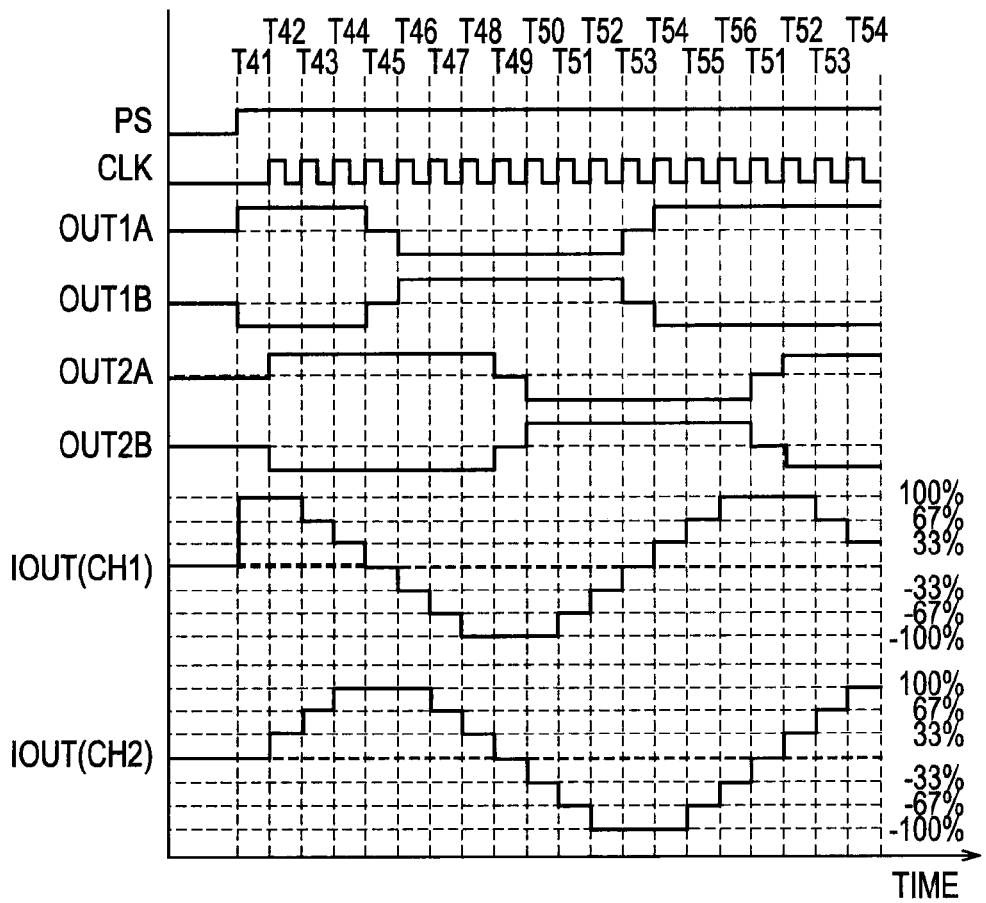
FIGS. 25A and 25B are views explaining operations of the motor driver according to the first embodiment of the present invention in the quarter step mode.
Figure 25B:
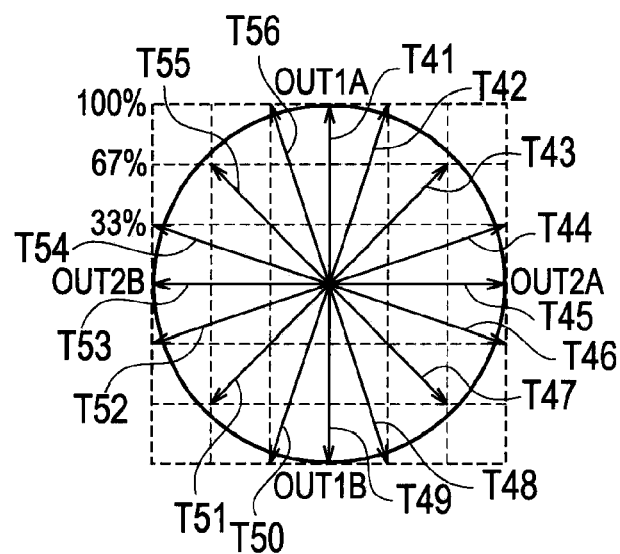

The setting signal MODE0 is set at the H level, and the setting signal MODE1 is set at the H level, whereby the motor magnetization mode is set at the "quarter step". As shown in FIG. 25A, when the reset signal PS rises to the H level in a period T41, the output signal OUT1A rises to the H level, and the output signal OUT1B drops to the L level. Moreover, the output signal OUT2A and the output signal OUT2B are at the 0 level. In the period T41, the output current IOUT(CH1) fully flows in the + direction, and the output current IOUT (CH2) does not flow.

Here, attention is paid to the output of the CH1. In a period T42 to a period T44, the output signal OUT1A maintains the H level, and the output signal OUT1B maintains the L level. However, the magnitude of the output current IOUT(CH1) is gradually decreased from 100% through 67% to 33%. Then, when the output signal OUT1A and the output signal OUT1B turn to the 0 level in a period T45, the output current IOUT (CH1) does not flow.

In a period T46 to a period T52, the output signal OUT1A is at the L level, and the output signal OUT1B is at the H level. The output current IOUT(CH1) flows in the − direction, and the magnitude thereof is gradually increased from 33% through 67% to 100% in the period T46 to the period T48. In the period T48 to the period T50, the magnitude of the output current IOUT(CH1) is 100%; however, is gradually decreased through 67% to 33% in the period T51 and the period T52. When the output signal OUT1A and the output signal OUT1B turn to the 0 level in a period T53, the output current IOUT (CH1) does not flow.

In a period T54 to a period T56, the output signal OUT1A is at the H level, and the output signal OUT1B is at the L level. The output current IOUT(CH1) flows in the + direction, and the magnitude thereof is gradually increased from 33% through 67% to 100% in the period T54 to the period T56.

Meanwhile, when attention is paid to the output of the CH2, in the period T42 to the period T48, the output signal OUT2A is at the H level, and the output signal OUT2B is at the L level. The output current IOUT(CH2) flows in the + direction, and the magnitude thereof is gradually increased from 33% through 67% to 100% in the period T42 to the period T44. In the period T44 to the period T46, the magnitude of the output current IOUT(CH2) is 100%; however, is gradually decreased through 67% to 33% in the period T47 and the period T48. When the output signal OUT2A and the output signal OUT2B turn to the 0 level in the period T49, the output current IOUT(CH2) does not flow.

In the period T50 to the period T56, the output signal OUT2A is at the L level, and the output signal OUT2B is at the H level. In the period T50 to the T52, the output current IOUT(CH2) flows in the − direction, and the magnitude thereof is gradually increased from 33% through 67% to 100%. Then, in the period T52 to the period T54, magnitude of the output current IOUT(CH2) is 100%; however, is gradually decreased through 67% to 33% in the period T55 and the T56.

Thereafter, when the clock signal CLK rises up, the output signal OUT1A maintains the H level, and the output signal OUT1B maintains the L level. The output signal OUT2A and the output signal OUT2B turn to the 0 level. The output current IOUT (CH1) fully flows in the + direction, and the output current IOUT(CH2) does not flow. Specifically, such a "quarter step" mode returns to the same state as that in the period T41. Thereafter, the operations in the period T41 to the period T56 are repeated.

As described above, in the case where the motor magnetization mode is the "quarter step", the clock signal CLK is changed 16 times, whereby the electrical angle reaches 360°. Moreover, the magnitudes of the output current IOUT(CH1) and the output current IOUT(CH2) are restricted, and the magnitude of the drive current is substantially constant without depending on the electrical angles. Hence, the torque vector at the time of the "quarter step" is shown like FIG. 25B. The motor magnetization mode is set at the "quarter step", whereby the rotation of the stepping motor can be smoothened.

Figure 26:
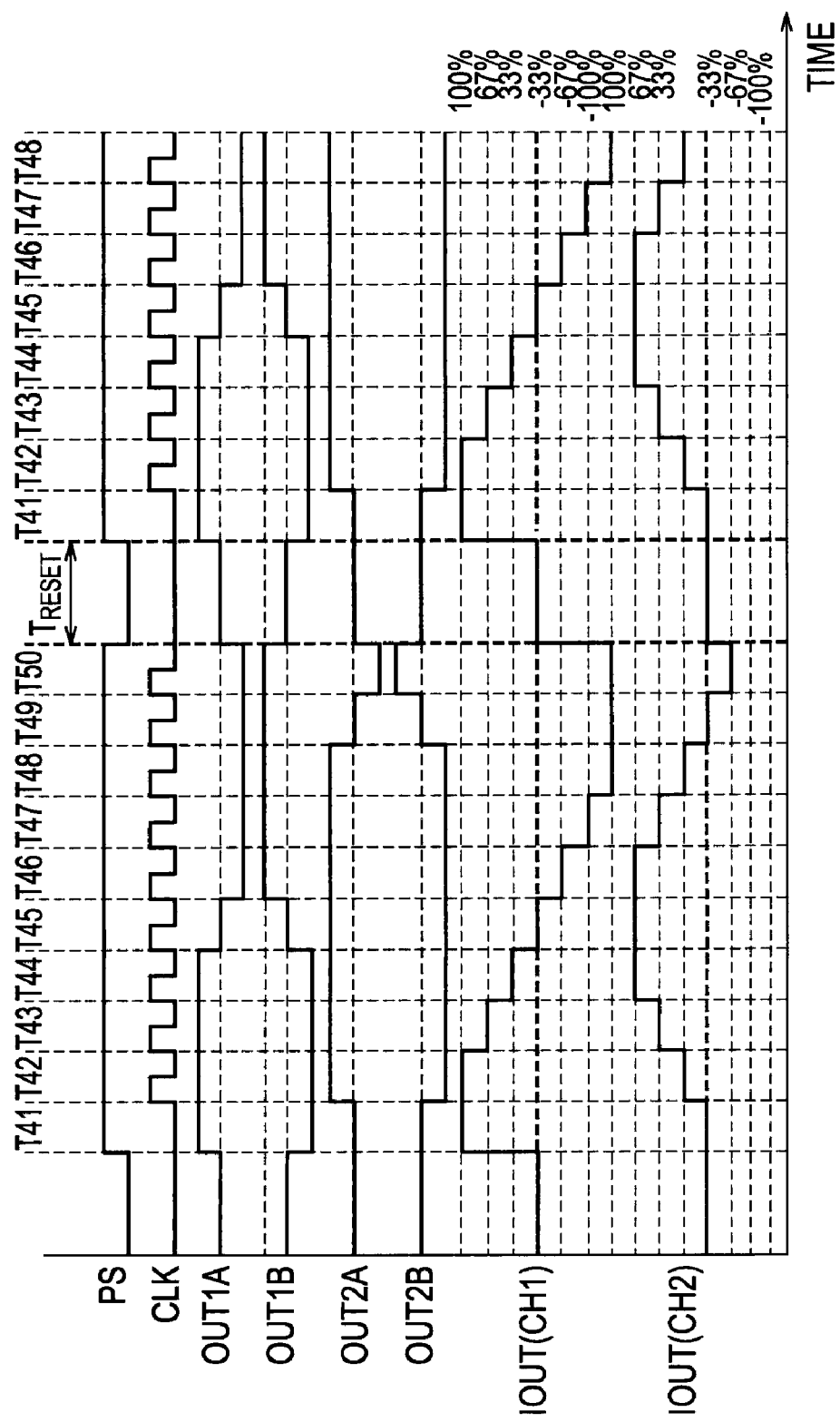
FIG. 26 is a timing chart for explaining reset timing of the motor driver according to the first embodiment of the present invention.

FIG. 26 shows an example of a timing chart in the case of resetting the decoder 11 during the operation of the motor driver 1. FIG. 26 shows an example where the decoder 11 is reset after the period T50 in the case where the motor magnetization mode is the "quarter step" shown in FIG. 25A. As shown in FIG. 26, the reset signal PS is dropped to the L level, whereby the reset operation is executed regardless of the other input signals. When the reset operation is executed, the motor driver 1 turns to the standby state, and opens the motor output.

The reset signal PS is raised to the H level after a reset period $T_{RESET}$, whereby the motor driver 1 returns to the usual state. After returning to the usual state, as shown in FIG. 26, the motor driver 1 executes the operations in the period T41.

Figure 27:
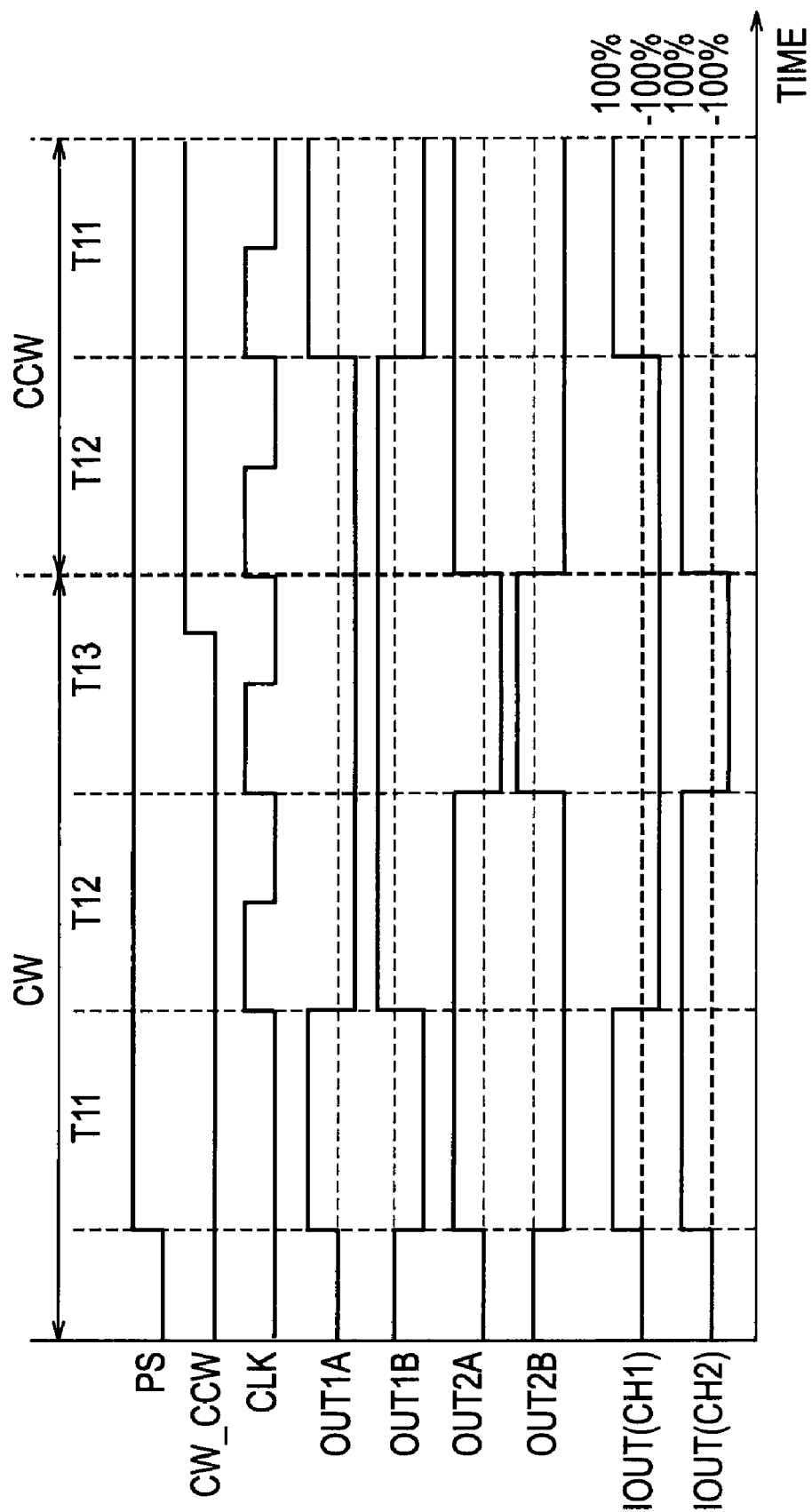
FIG. 27 is a timing chart for explaining timing of switching the motor rotational directions of the motor driver according to the first embodiment of the present invention.

FIG. 27 shows an example of a timing chart in the case of changing the motor rotational direction by the setting signal CW_CCW. FIG. 27 shows an example where the motor rotational direction is changed to the CCW direction after operating the stepping motor in the CW direction in the period T11 to the period T13 in the case where the motor magnetization mode is the "full step" shown in FIG. 22A. As shown in FIG. 27, the change of the motor rotational direction, which is performed by raising the setting signal CW_CCW to the H level in the period T13, is reflected on the rising edge of the clock signal CLK immediately after the setting signal CW_CCW is changed.

However, even if the control on the motor driver 1 responds to such switching of the motor rotational direction, the stepping motor cannot follow the switching concerned depending on the operation state of the stepping motor at the time of switching the motor rotational direction, and as a result, it is possible that a loss of synchronization, misstep and the like of the stepping motor may occur. Therefore, it is necessary to make a sufficient evaluation for a switching sequence of the motor rotational direction.

Figure 28:
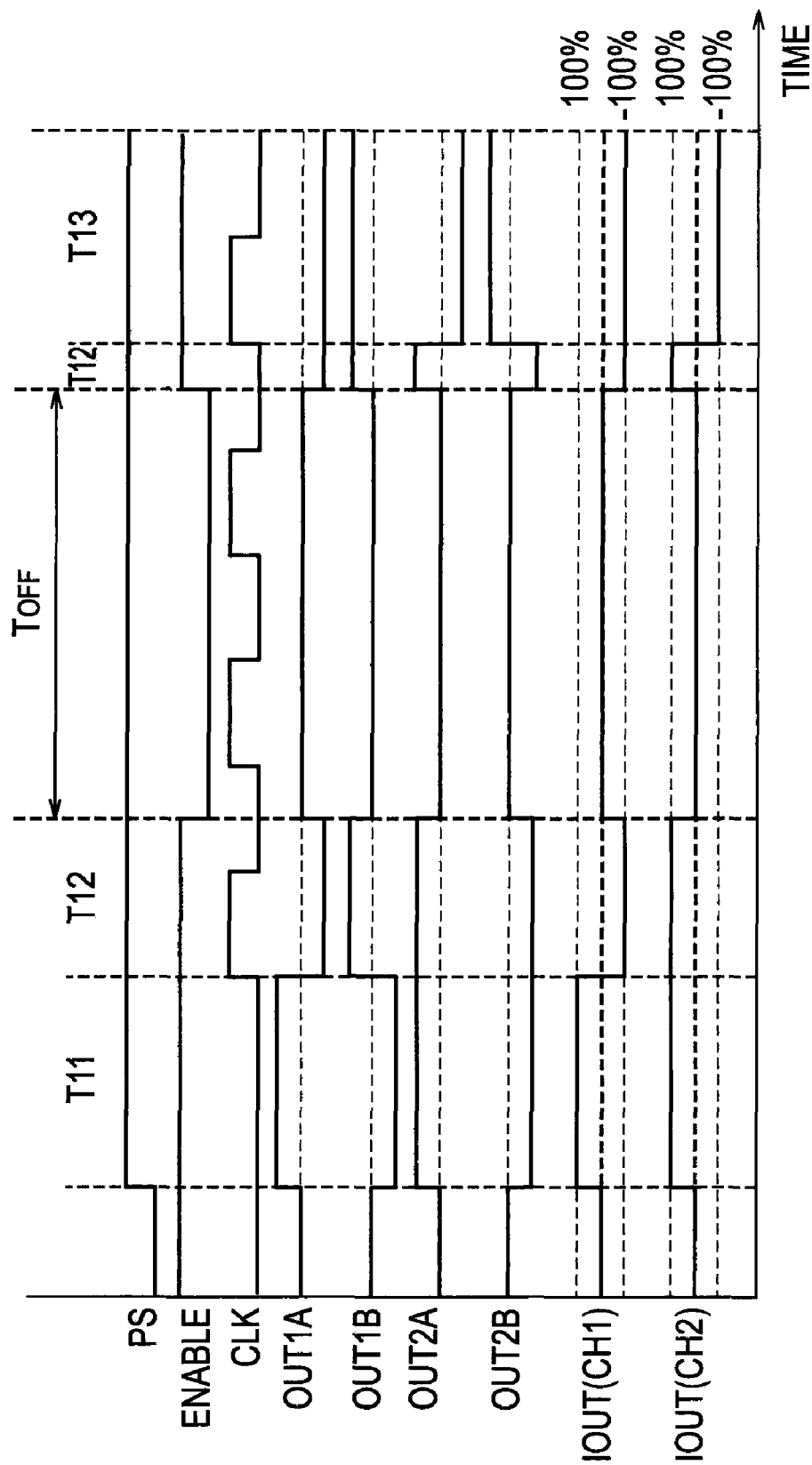
FIG. 28 is a timing chart for explaining enable operations of the motor driver according to the first embodiment of the present invention in a case where a clock signal is at a high level.
Figure 29:
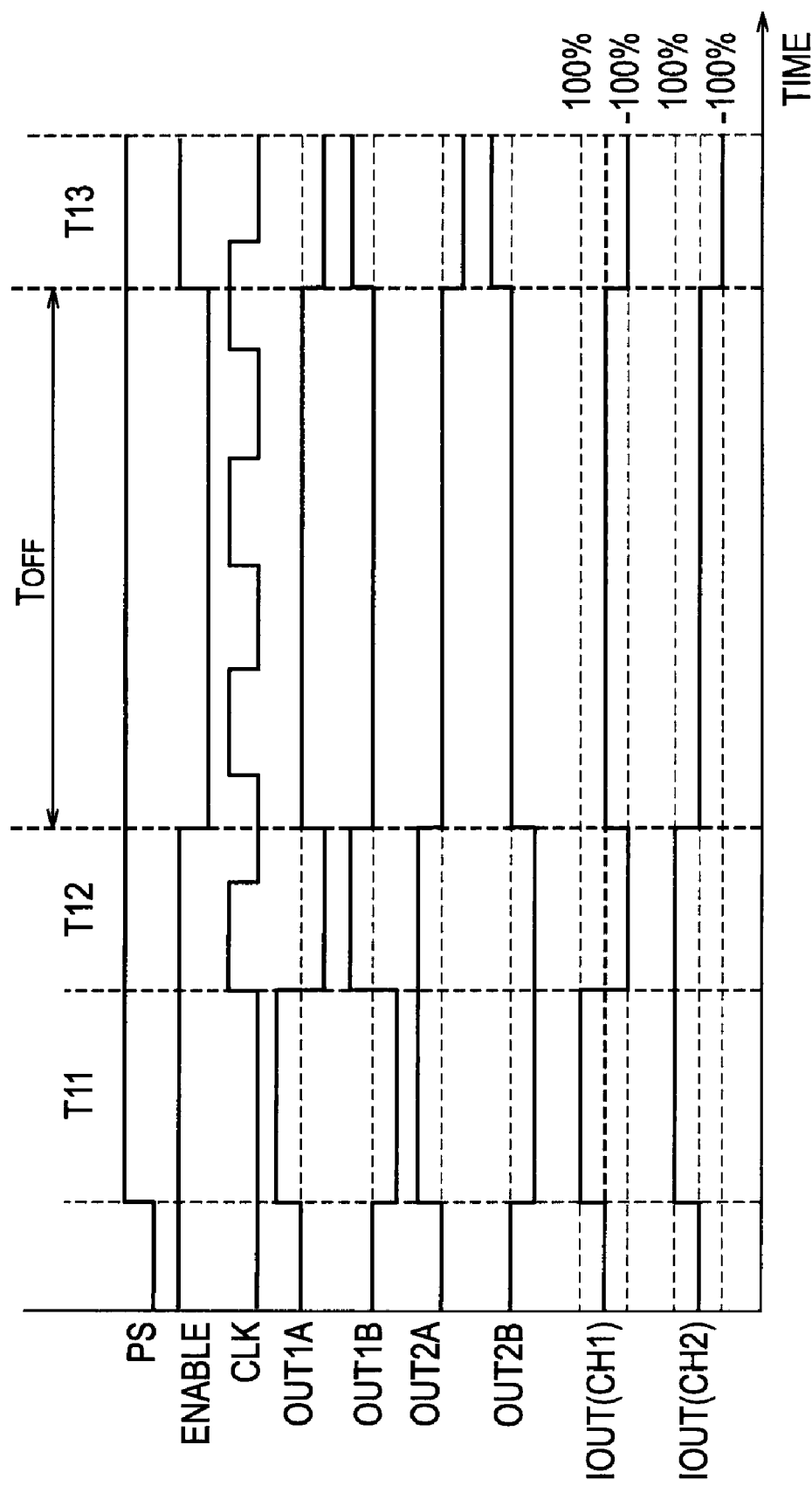
FIG. 29 is a timing chart for explaining enable operations of the motor driver according to the first embodiment of the present invention in a case where the clock signal is at a low level.

FIG. 28 and FIG. 29 show examples of timing charts in the case of stopping the motor driver 1 by the output enable signal ENABLE. The output enable signal ENABLE is dropped from the H level to the L level, the motor driver 1 is stopped regardless of the other input signals. While the output enable signal ENABLE is being at the L level, the motor output is opened, and the motor driver 1 is stopped. Accordingly, the phase-advancing operation is not performed even if the clock signal CLK is inputted.

In the motor driver 1, it is possible to measure an approximate chip temperature of the motor driver 1 by using the TEST terminal P15. A protection diode for preventing the ESD is connected to the TEST terminal P15. Accordingly, the chip temperature can be monitored by using this protection diode. A description will be made below of a method of monitoring the chip temperature with reference to FIG. 30.

Figure 30:
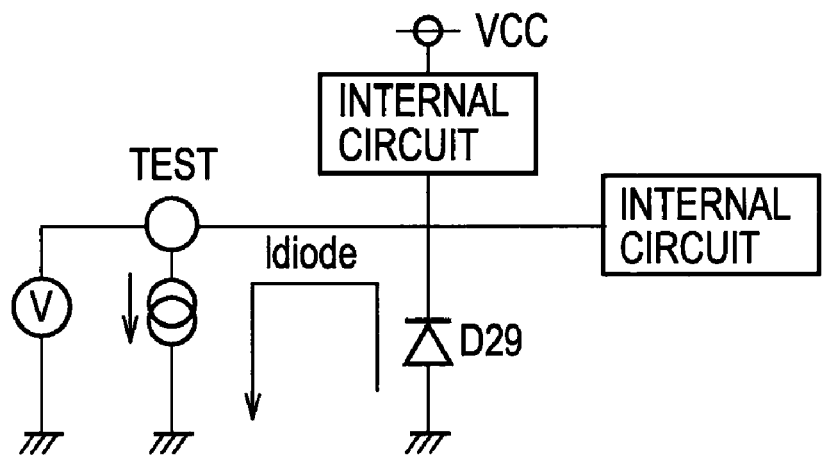
FIG. 30 is a circuit diagram for explaining a method for monitoring a chip temperature of the motor driver according to the first embodiment of the present invention.

(1) The power supply voltage is not applied to the motor driver 1, but as shown in FIG. 30, a current $I_{diode}$ of approximately 50 μA is flown from the TEST terminal P15 to the GND, and a terminal voltage of the TEST terminal P15 is measured. In this measurement, a Vf voltage of a protection diode D29 connected to the TEST terminal P15 is measured.

Figure 31:
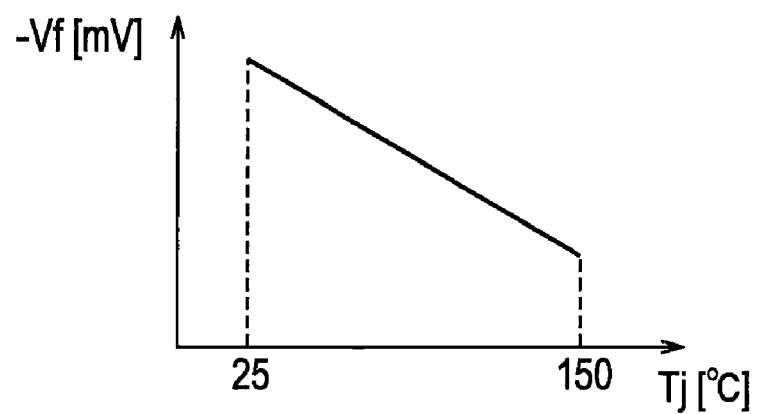
FIG. 31 is a graph showing an example of a relationship between the chip temperature and a Vf voltage.

(2) Temperature characteristics of the terminal voltage of the TEST terminal P15 are measured. The Vf voltage of the diode has a linear negative temperature coefficient, and accordingly, by using a measurement result of the temperature characteristics, the chip temperature can be calibrated based on the terminal voltage of the TEST terminal P15. FIG. 31 shows an example of a relationship between the chip temperature Tj and the Vf voltage.

(3) The power supply voltage is applied to the motor driver 1, the terminal voltage of the TEST terminal P15 is measured while driving the stepping motor, and the chip temperature is estimated by using the result of (2). Note that, as already described, at the time of the usual operation of the motor driver 1, the TEST terminal P15 is connected to the GND.

FIG. 32 shows examples of electrical characteristics of the motor driver 1. In FIG. 32, unless particularly specified, characteristic values are those in the case where the ambient temperature Ta is 25° C., and 42V as the power supply voltage is applied to the VCC1 terminal P5 and the VCC2 terminal P20.

The maximum rating of the power supply voltage applied to the VCC1 terminal P5 and the VCC2 terminal P20 is −0.2V to 50V. As shown in FIG. 1, the motor driver 1 includes the regulator 18, and accordingly, is driven by a single power supply system. Therefore, it is easy to design the set. Moreover, within ranges of an allowable dissipation depending on specifications of the package and a board, and the like, and of an area of safety operation (ASO) of the output transistors and the like, under a condition where the chip temperature Tj does not exceed a predetermined maximum junction temperature $Tj_{max}$ (for example, 150° C.), the maximum rating of the output current is, for example, 1.0 A/phase. However, the maximum rating of the output current is not limited to 1.0 A/phase, and for example, may be 1.5 A/phase and 2.0 A/phase.

Note that, with regard to operation conditions of the motor driver 1 within a range where the ambient temperature Ta is equal to −25° C. to 85° C., the power supply voltages VCC1 and VCC2 are 19 to 45V (standard: 42V), and the output current $I_{OUT}$ (continuous) is 0.5 A/phase as a standard, and 0.7 A/phase at the maximum.

FIG. 33 shows an example of driving a stepping motor 201 built in a device 200 by the motor driver 1. Under the control of the motor driver 1, the stepping motor 201 rotates a rotor 202 in an inside of the device 200 step by step. For example, the device 200 is a serial dot impact printer, a sewing machine, a facsimile machine, a copier and the like. Note that a configuration may be adopted, in which the stepping motor 201 is disposed outside of the device.

Based on an inductance value Lc and resistance value Rc of motor coils of the stepping motor 201 to be driven, and on a desired number of rotations, the current decay mode of the motor driver 1 is set. For example, in the case where a time constant Rc/Lc of the stepping motor 201 is large, and the switching of the DAC 12 is fast in order to rotate the stepping motor 201 at high speed, the ratio of the fast decay mode is increased, and the current decay mode is set. In the case where the time constant Rc/Lc is small, the current decay mode in which the ratio of the fast decay mode is low is set. Moreover, a user can optimally set the current decay mode of the motor driver 1 by measuring oscillations of the stepping motor 201, and so on.

In order to drive a stepping motor that requires large torque for the purpose of operating sheet feed units of the copier, the printer and the like, it is preferable to set the motor magnetization mode at the full step and the half step A. Meanwhile, in order to drive a stepping motor that requires small oscillations for the purpose of being used for a scanner for which a precise capture function is required, a surveillance camera in which steps are small, and the like, it is preferable to set the motor magnetization mode at the half step B and the quarter step.

In accordance with the motor driver 1 according to the first embodiment of the present invention, the period of the first decay rate and the period of the second decay rate are adjusted, whereby the current decay rate in the current decay period can be adjusted in stages. Therefore, there can be provided the motor driver 1 that can realize the optimum controls individually for the stepping motors with the variety of specifications. Moreover, the number of terminals for use in the operation timing control is only one, which is the CLK terminal P13. Accordingly, for example, in the case where there are limitations on the number of ports on the CPU board, the motor driver 1 shown in FIG. 1 is suitable.

Second Embodiment

Figure 34:
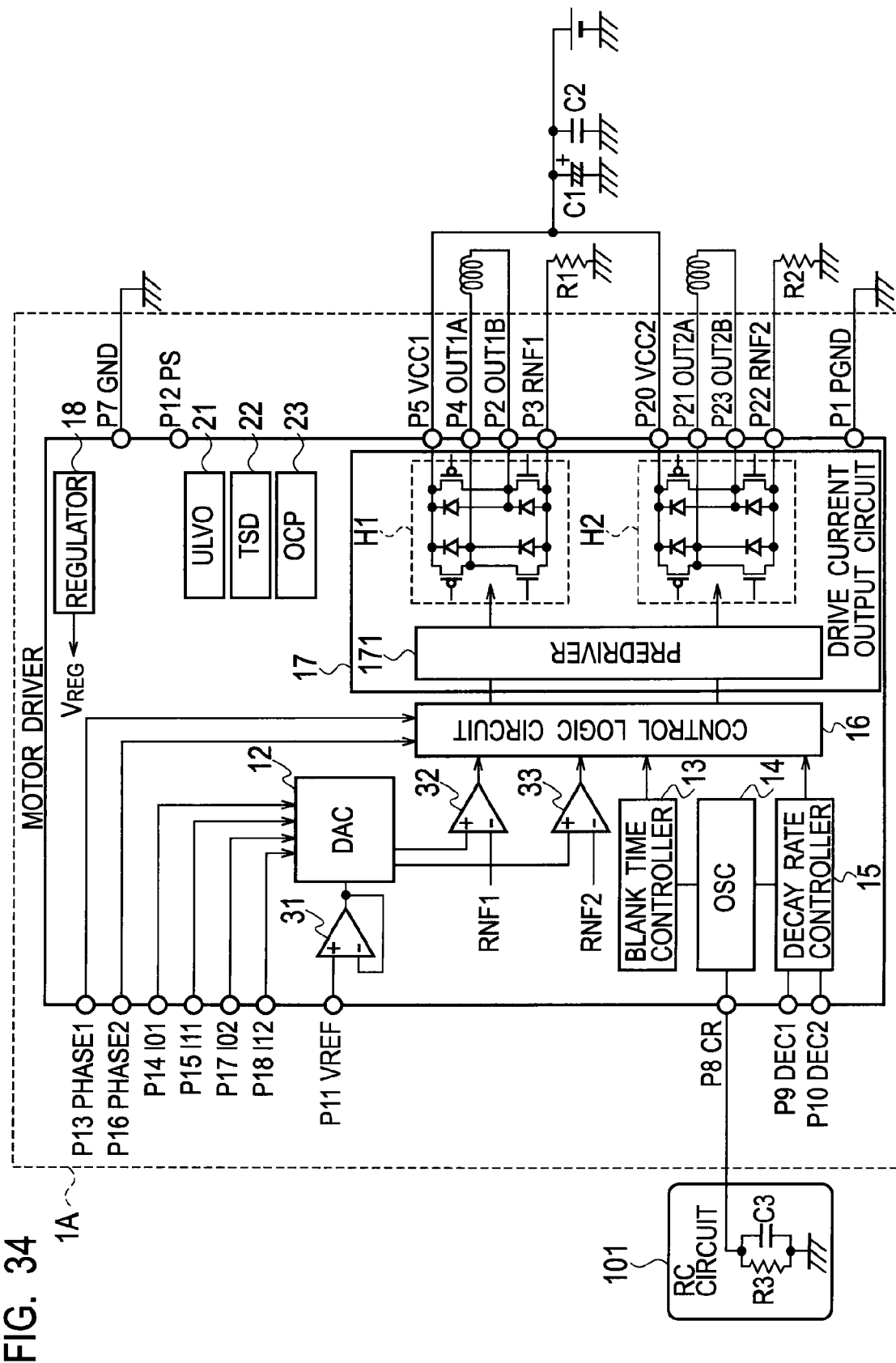
FIG. 34 is a schematic block diagram showing a configuration of a motor driver according to a second embodiment of the present invention.

A motor driver 1A according to a second embodiment of the present invention is different from the motor driver 1 shown in FIG. 1 in that the decoder 11 is not provided as shown in FIG. 34. Although details will be described later, the motor driver 1A operates in accordance with a "parallel IN drive mode" of controlling operation timings of the motor driver 1A by logic signals inputted individually to a plurality of input terminals thereof, and in this point, is different from the motor driver 1 that controls the operation timings in accordance with the clock IN drive mode. Other configurations are similar to those of the first embodiment shown in FIG. 1.

FIG. 35 shows information of input/output terminals of the motor driver 1A shown in FIG. 34. In place of the terminals connected to the decoder 11 of the motor driver 1, the motor driver 1A includes, as VREF division ratio setting terminals, an I01 terminal P14, an I11 terminal P15, an I02 terminal P17 and an I12 terminal P18, as well as a PHASE1 terminal P13 and a PHASE2 terminal P16.

Signals for designating the current flowing directions in the first H-bridge circuit H1 and the second H-bridge circuit H2 are inputted to the PHASE1 terminal P13 and the PHASE2 terminal P16, which are phase switching terminals. In such a way, the output logics of the drive current output circuit 17 are decided. FIG. 36 shows examples of signal levels of the OUT1A terminal P4, the OUT1B terminal P2, the OUT2A terminal P21 and the OUT2B terminal P23 with respect to input signal levels of the PHASE1 terminal P13 and the PHASE2 terminal P16. In the motor driver 1 shown in FIG. 1, the control signals corresponding to the signals set for the phase switching terminals are outputted from the decoder 11 to the control logic circuit 16.

The I01 terminal P14, the I11 terminal P15, the I02 terminal P17 and the I12 terminal P18 (VREF division ratio setting terminals) are terminals which receive signals for setting the division ratio of the reference voltage set by the DAC 12 and setting the magnitudes of the output currents. Specifically, the reference voltage $V_{REF}$ applied to the VREF terminal P11 as the output current value setting terminal is inputted to the DAC 12, and the levels of the signals individually inputted to the VREF division ration setting terminals decide the division ratio of the reference voltage $V_{REF}$ set by the DAC 12 is set by. As a result, for example, as shown in FIG. 37, values of the output currents are set.

Note that the magnitude of the output current IOUT(CH1) of the CH1 is set by the I01 terminal P14 and the I11 terminal P15. The magnitude of the output current IOUT(CH2) of the CH2 is set by the I02 terminal P17 and the I12 terminal P18. In the case where all of the VREF division ratio setting terminals are at the H level, the motor output is opened. In the motor driver 1 shown in FIG. 1, the control signal corresponding to the signals set for the VREF division ratio setting terminals is outputted from the decoder 11 to the DAC 12.

FIGS. 38A, 39A, 40A and 41A show examples of timing charts in the case of driving the stepping motor in the "full step", the "half step A", the "half step B" and the "quarter step" by the motor driver 1A having the characteristics shown in FIG. 36 and FIG. 37, and FIGS. 38B, 39B, 40B and 41B show examples of torque vectors therein. Note that, in the "half step B" and the "quarter step", the magnitudes of the output currents of the CH1 and the CH2 are restricted by the DAC 12, and the drive current flows with a substantially constant magnitude without depending on the electrical angles.

FIGS. 38A to 41A show timing charts of the "full step", the "half step A", the "half step B" and the "quarter step", respectively. Each of FIGS. 38A to 41A shows states of an input signal PHASE1 of the PHASE1 terminal P13, an input signal PHASE2 of the PHASE2 terminal P16, an input signal I01 of the I01 terminal P14, an input signal I11 of the I11 terminal P15, an input signal I02 of the I02 terminal P17, and an input signal I12 of the I12 terminal P18, and states of the output current IOUT(CH1) of the CH1 and the output current IOUT(CH2) of the CH2.

FIGS. 38B to 41B show torque vectors of the output signal OUT1A, the output signal OUT1B, the output signal OUT2A and the output signal OUT2B in the respective "full step", "half step A", "half step B" and "quarter step".

First, a description will be made of the case of driving the stepping motor by the "full step". Here, all of the VREF division ratio setting terminals are set at the L level. Therefore, as shown in FIG. 37, in the case where the output current IOUT(CH1) and the output current IOUT(CH2) flow, both of the output currents flow fully (with a magnitude of 100%).

Figure 38A:
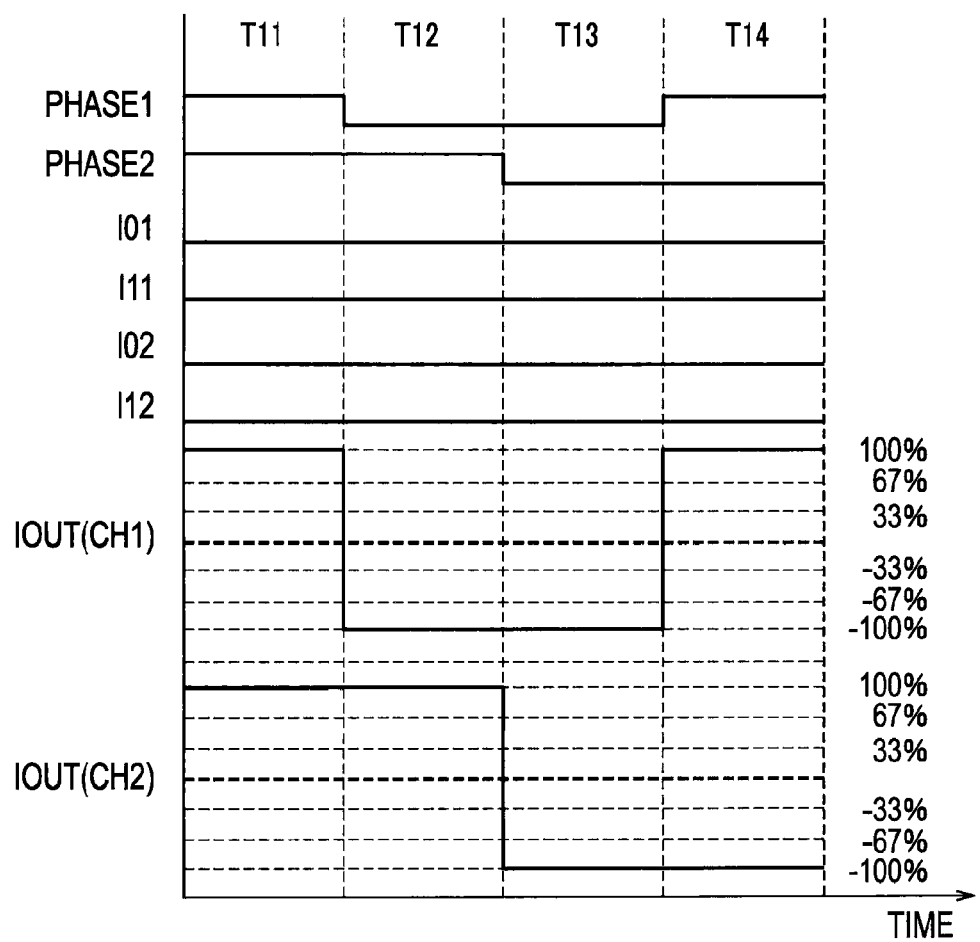
FIGS. 38A and 38B are views explaining operations of the motor driver according to the second embodiment of the present invention in the full step mode.
Figure 38B:
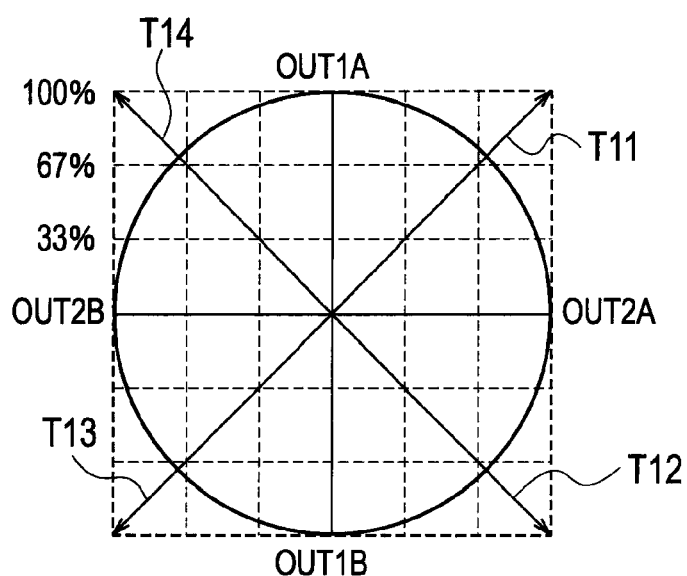

As shown in FIG. 38A, both of the input signal PHASE1 and the input signal PHASE2 are at the H level in a period T11. Accordingly, the output current IOUT(CH1) and the output current IOUT(CH2) flow in the + direction.

When only the input signal PHASE1 drops to the L level in a period T12, the direction of the output current IOUT(CH1) is reversed, and the direction of the output current IOUT (CH2) is not changed.

When both of the input signal PHASE1 and the input signal PHASE2 turn to the L level in a period T13, the output current IOUT(CH1) and the output current IOUT(CH2) flow in the − direction.

When only the input signal PHASE1 rises to the H level in a period T14, the direction of the output current IOUT(CH1) is reversed, and the direction of the output current IOUT (CH2) is not changed. Thereafter, the operations in the period T11 to the period T14 are repeated.

As described above, in the case of the "full step", the output current IOUT(CH1) and the output current IOUT(CH2) are controlled only by the input signal PHASE1 and the input signal PHASE2. The electrical angle reaches 360° in the period T11 to the period T14, and accordingly, the torque vector at the time of the "full step" is shown like FIG. 38B.

Next, a description will be made of the case of driving the stepping motor by the "half step A". In the "half step A", while controlling the output logics of the CH1 and the CH2 by the input signal PHASE1 and the input signal PHASE2 in a similar way to the case of the "full step", the magnitudes of the output currents of the CH1 and the CH2 are controlled by the input signal I01, the input signal I11, the input signal I02 and the input signal I11.

However, the input signal I01 and the input signal I11, which are for controlling the magnitude of the output current IOUT(CH1) of the CH1, are always maintained at the same level, and the input signal I02 and the input signal I12, which are for controlling the magnitude of the output current IOUT (CH2) of the CH2, are always maintained at the same level. As shown in FIG. 37, in the case where both of the input signal I01 and the input signal I11 are at the H level, and both of the input signal I02 and the input signal I12 are at the H level, the value of the output current is 100%. Meanwhile, in the case where both of the input signal I01 and the input signal I11 are at the L level, and both of the input signal I02 and the input signal I12 are at the L level, the value of the output current is 0%. Therefore, as shown in FIG. 39A and FIG. 39B, the output current is fully outputted in the "half step A".

Figure 39A:
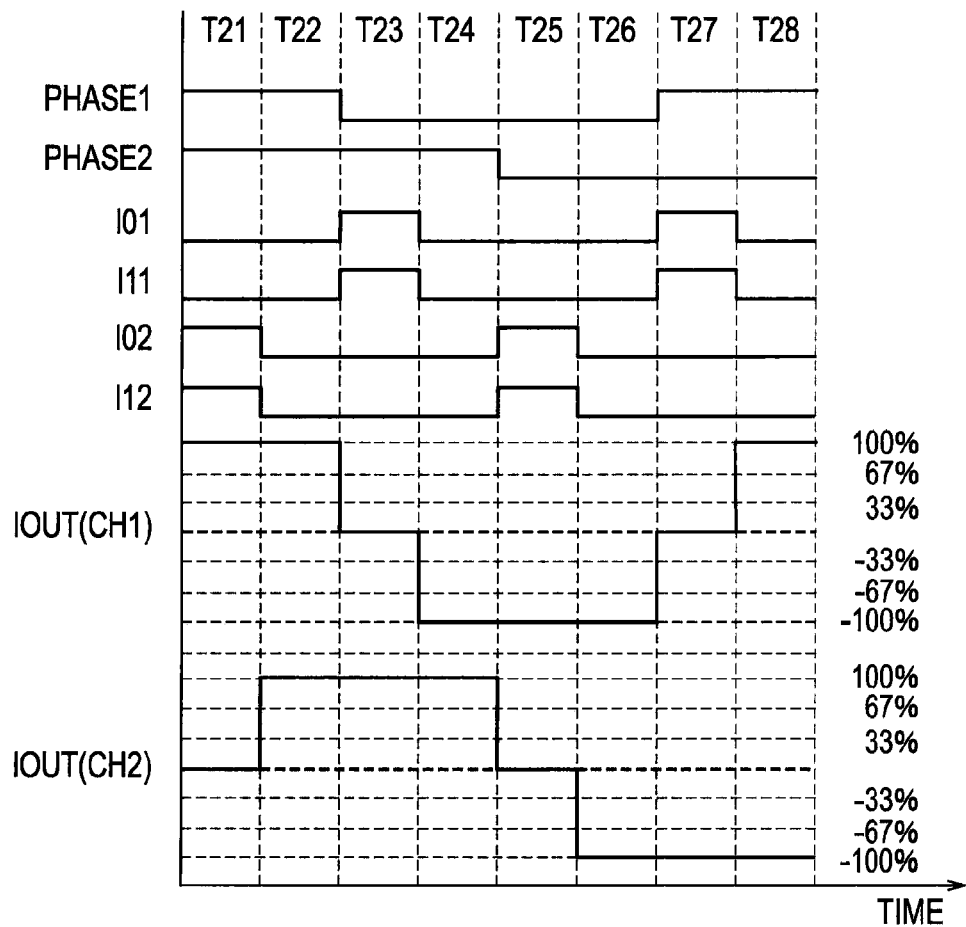
FIGS. 39A and 39B are views explaining operations of the motor driver according to the second embodiment of the present invention in the half step A mode.
Figure 39B:
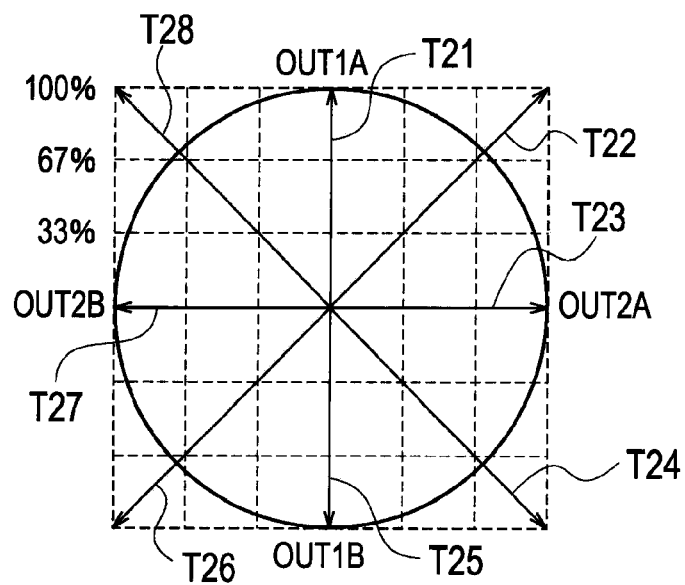

For example, in a period T21 of FIG. 39A, both of the input signal PHASE1 and the input signal PHASE2 are set at the H level, both of the input signal I01 and the input signal I11 are set at the L level, and both of the input signal I02 and the input signal I12 are set at the H level. Therefore, the output current IOUT(CH1) fully flows in the + direction, and the output current IOUT(CH2) does not flow.

In the next period T22, both of the input signal PHASE1 and the input signal PHASE2 are set at the H level, both of the input signal I01 and the input signal I11 are set at the L level, and both of the input signal I02 and the input signal I12 are set at the L level. Therefore, the output current IOUT(CH1) and the output current IOUT(CH2) fully flow in the + direction.

As described above, in the "half step A", the output current IOUT(CH1) and the output current IOUT(CH2) are controlled by the input signals PHASE1 and PHASE2, and the input signal I01, the input signal I11, the input signal I02 and the input signal I11. The electrical angle reaches 360° in the period T21 to a period T28, and accordingly, the torque vector at the time of the "half step A" is shown like FIG. 39B.

Next, a description will be made of the case of driving the stepping motor by the "half step B". In the "half step B", in a similar way to the case of the "half step A" shown in FIG. 39A, the output logics of the CH1 and the CH2 are controlled by the input signal PHASE1 and the input signal PHASE2.

Figure 40A:
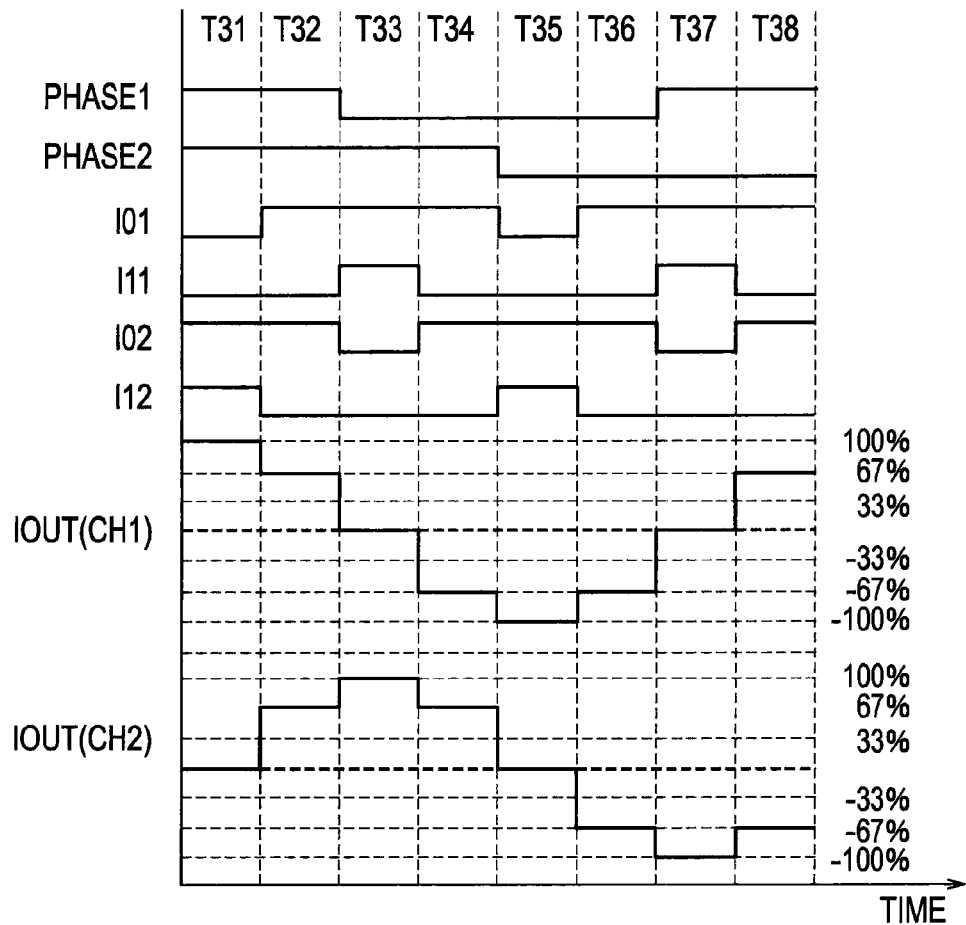
FIGS. 40A and 40B are views explaining operations of the motor driver according to the second embodiment of the present invention in the half step B mode.
Figure 40B:
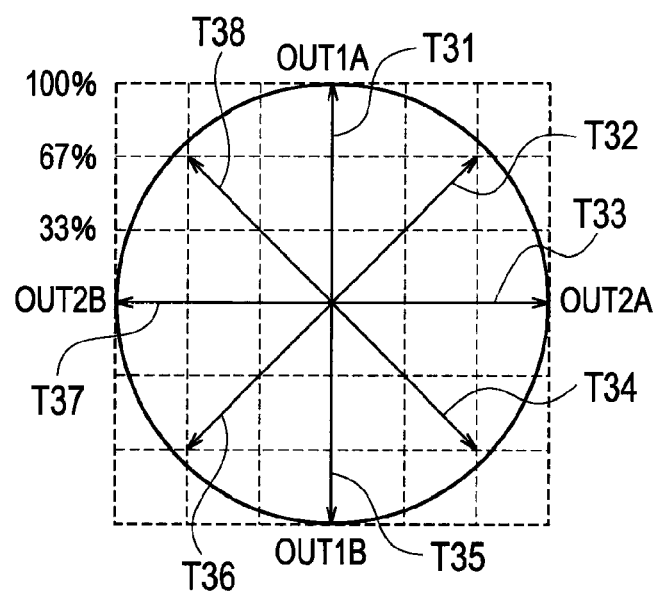

However, unlike the case of the "half step A", in the "half step B", a period while the input signal I01 and the input signal I11 are at different levels is set, and the magnitude of the output current IOUT(CH1) is adjusted to any of 100%, 67% and 0%. Moreover, a period while the input signal I02 and the input signal I12 are at different levels is set, and the magnitude of the output current IOUT(CH2) is adjusted to any of 100%, 67% and 0%. Then, as shown in FIG. 40A, in a period while the output current IOUT(CH1) and the output current IOUT(CH2) flow simultaneously, current values of the output current IOUT(CH1) and the output current IOUT(CH2) are set so as to become 67%. Hence, the torque vector at the time of the "half step B" is shown like FIG. 40B. In the "half step B", the rotation of the stepping motor can be smoothened more than in the case of the "half step A".

Next, a description will be made of the case of driving the stepping motor by the "quarter step". In the "quarter step", in a similar way to the case of the "half step B" shown in FIG. 40A, the output current IOUT(CH1) and the output current IOUT(CH2) are controlled by the input signal PHASE1, the input signal PHASE2, the input signal I01, the input signal I11, the input signal I02 and the input signal I12.

Figure 41A:
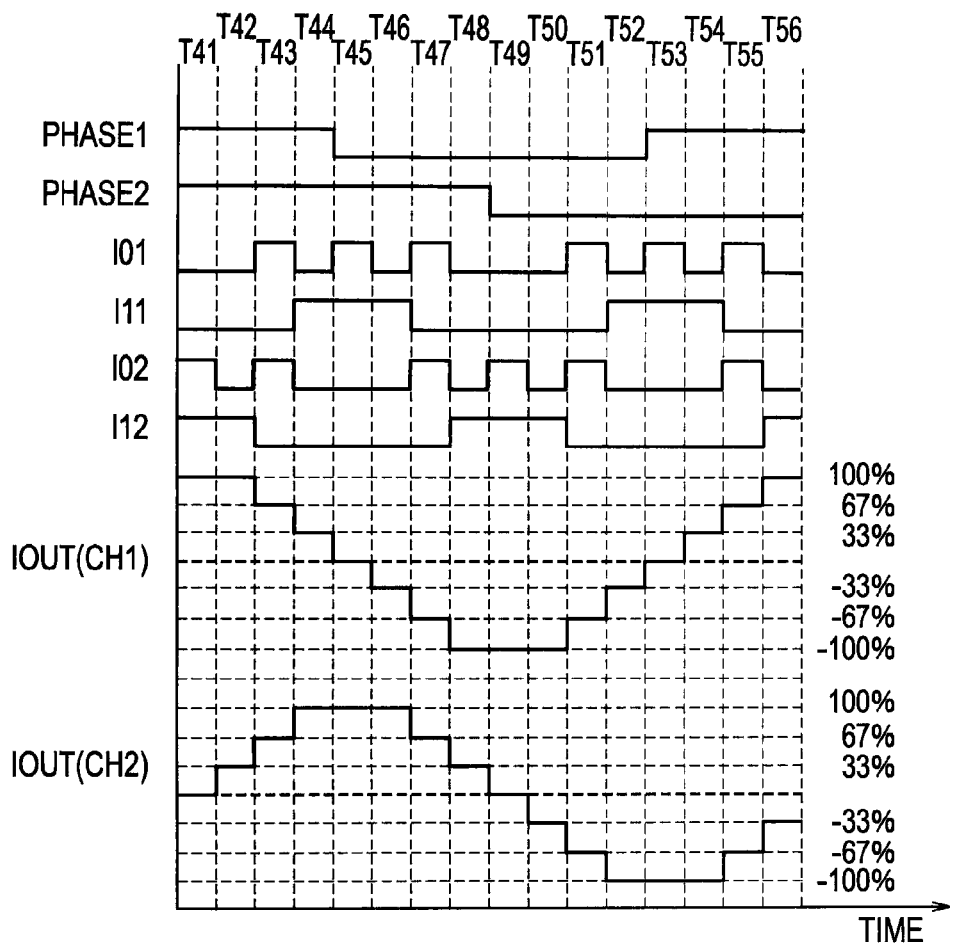
FIGS. 41A and 41B are views explaining operations of the motor driver according to the second embodiment of the present invention in the quarter step mode.
Figure 41B:
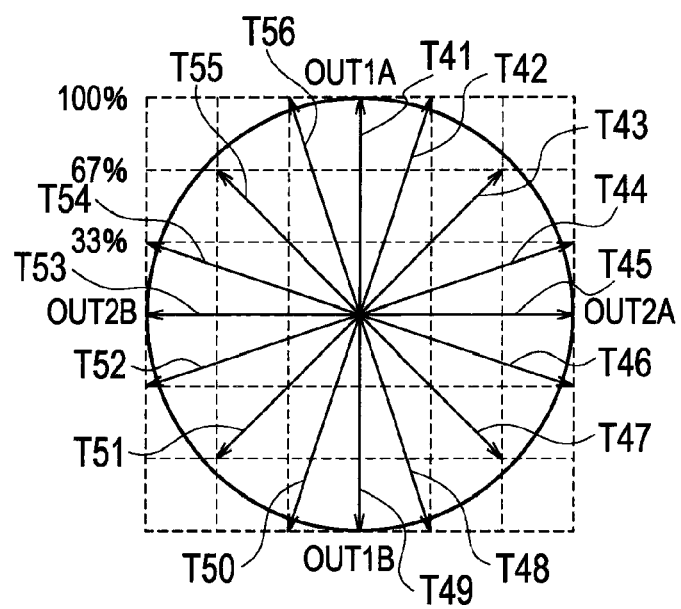

However, as shown in FIG. 41A, the combination of the input signal I01, the input signal I11, the input signal I02 and the input signal I12 is set more finely than in the case of the "half step B", whereby each value of the output current IOUT(CH1) and the output current IOUT(CH2) is adjusted to any of 100%, 67%, 33% and 0%.

For example, in a period T41 of FIG. 41A, both of the input signal I01 and the input signal I11 are set at the L level, and both of the input signal I02 and the input signal I12 are set at the H level. Therefore, the output current IOUT(CH1) fully flows in the +direction, and the output current IOUT(CH2) does not flow.

In the next period T42, both of the input signal I01 and the input signal I11 are maintained at the L level, the input signal I02 is set at the L level, and the input signal I12 is maintained at the H level. Therefore, the output current IOUT(CH1) flows with the magnitude of 67% in the +direction, and the output current IOUT(CH2) flows with the magnitude of 33% in the +direction.

In a period T43, the input signal I01 is set at the H level, and the input signal I11 is maintained at the L level. Then, the input signal I02 is set at the H level, and the input signal I12 is set at the L level. Therefore, the output current IOUT(CH1) flows with the magnitude of 33% in the +direction, and the output current IOUT(CH2) flows with the magnitude of 67% in the +direction.

Then, in a period T44, the input signal I01 is set at the L level, and the input signal I11 is set at the H level. Moreover, the input signal I02 is set at the L level, and the input signal I12 is maintained at the L level. Therefore, the output current IOUT(CH1) does not flow, and the output current IOUT(CH2) fully flows in the +direction.

Thereafter, in a similar way, the directions and the magnitudes of the output current IOUT(CH1) and the output current IOUT(CH2) are set, and as shown in FIG. 41A, the electrical angle reaches 360° in the period T41 to a period T56. The phase switching terminals and the VREF division ratio setting terminals are set so that the drive current can flow with a substantially constant magnitude without depending on the electrical angle. Accordingly, the torque vector at the time of the "quarter step" is shown like FIG. 41B. Hence, the rotation of the stepping motor can be smoothened by the "quarter step".

As described above, in the motor driver 1A shown in FIG. 35, the output current IOUT(CH1) and the output current IOUT(CH2) are controlled by the input signal PHASE1 and the input signal PHASE2 from the phase switching terminals, and by the input signal I01, the input signal I11, the input signal I02 and the input signal I12 from the VREF division ratio setting terminals.

The motor driver 1 shown in FIG. 1 drives the stepping motor in the clock IN drive mode of setting the operation timings only by the CLK terminal P13. Therefore, it is not easy to make a recovery from a trouble that the motor driver 1 operates erroneously by such a fact that the noise is generated in the clock signal CLK. For example, in the case where the operations advance to the next step erroneously owing to the generation of the noise, the operations cannot be returned to such an original step. As opposed to this, in the motor driver 1A shown in FIG. 34, the operation timings are controlled by the plurality of input signals, and accordingly, the motor driver 1A can make the recovery more easily than the motor driver 1.

In accordance with the motor driver 1A according to the second embodiment of the present invention, the parallel IN drive mode of controlling the output current $I_{OUT}$ by the plurality of input signals is adopted, and the current decay rate in which the first decay rate and the second decay rate are mixed with each other is set, whereby the optimum controls can be realized individually for the stepping motors with the variety of specifications. Others are substantially similar to those of the first embodiment, and a duplicate description will be omitted.

Note that the functions of the motor driver 1 that is shown in FIG. 1 and adopts the clock IN drive mode and the functions of the motor driver 1A that is shown in FIG. 34 and adopts the parallel IN drive mode may be realized in one chip, and by wire bonding between a selector pad for this chip and the package, the motor driver 1 and the motor driver 1A may be properly used as follows.

As already described, the decoder 11 is initialized by setting the PS terminal P12 shown in FIG. 1 at the L level. The selector pad that selects the clock IN drive mode and the parallel IN drive mode is disposed so as to be adjacent to this PS terminal P12. The selector pad is connected to the GND by a pull-down resistor in an inside thereof. If the selector pad is open, then a signal of the low level is inputted to the inside thereof, and the clock IN drive mode is selected. Meanwhile, if a potential of a high level is inputted to the selector pad, then the parallel IN drive mode is selected.

Hence, by implementing the wire bonding between the PS terminal P12 and the selector pad, the circuit operates in the parallel IN drive mode when the signal of the high level is inputted to the PS terminal P12, and the circuit operates in the clock IN drive mode when the selector pad and the PS terminal P12 are not connected to each other.

For example, the drive mode is selected at the time of shipping the motor driver. In such a way, the motor driver can be provided, as described above, as the motor driver 1 that adopts the clock IN drive mode or the motor driver 1A that adopts the parallel IN drive mode to a user.

Other Embodiments

It should not be understood that the description and the drawings, which form a part of the disclosure of the above-described embodiments, limit this invention. From this disclosure, a variety of alternative embodiments, examples and operation technologies will be obvious for those skilled in the art.

In the description of the already-mentioned first or second embodiment, the example has been shown, where the current decay mode setting terminals are two terminals, which are the DEC1 terminal P9 and the DEC2 terminal P10; however, the number of current decay mode setting terminals may be increased to three or more. Moreover, the example has been shown, where the 2-bit signals are inputted to the DAC 12 that sets the value of the output current; however, the value of the output current may be controlled by inputting 3 or more-bit signals thereto.

As described above, it is obvious that the present invention includes various embodiments and the like not described above. Accordingly, the technical scope of the present invention is determined by only the invention elements according to claims appropriate from the viewpoint of the above explanation.

What is claimed is:

1. A motor driver that supplies a drive current to a stepping motor, the motor driver comprising:
    a decay rate controller configured to mix a first decay rate and a second decay rate smaller than the first decay rate with each other, and set a plurality of mix decay rates;
    a control logic circuit configured to create magnetization patterns for attenuating the drive current at the mix decay rates;
    a drive current output circuit configured to output the drive current to the stepping motor in accordance with the magnetization patterns; and
    a plurality of decay rate setting terminals configured to receive setting signals from outside of the motor driver, wherein the decay rate controller is controlled by the setting signals and sets the plurality of mix decay rates.

2. The motor driver of claim 1, wherein the decay rate controller changes a ratio of a period of attenuating the drive current at the first decay rate and a period of attenuating the drive current at the second decay rate during a current decay period of the drive current, and sets the plurality of mix decay rates.

* * * * *